United States Patent
Disch et al.

(10) Patent No.: US 10,157,624 B2
(45) Date of Patent: Dec. 18, 2018

(54) APPARATUS AND METHOD FOR PROCESSING AN AUDIO SIGNAL USING A COMBINATION IN AN OVERLAP RANGE

(71) Applicant: Fraunhofer-Gesellschaft zur Foerderung der angewandten Forschung e.V., Munich (DE)

(72) Inventors: Sascha Disch, Fuerth (DE); Frederik Nagel, Heroldsberg (DE); Ralf Geiger, Erlangen (DE); Christian Neukam, Kalchreuth (DE); Bernd Edler, Fuerth (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 15/047,322

(22) Filed: Feb. 18, 2016

(65) Prior Publication Data

US 2016/0163323 A1   Jun. 9, 2016

Related U.S. Application Data

(63) Continuation of application No. PCT/EP2014/067944, filed on Aug. 22, 2014.

(30) Foreign Application Priority Data

Aug. 23, 2013   (EP) ..................................... 13181507

(51) Int. Cl.
  *G10L 19/022*   (2013.01)
  *G10L 19/02*   (2013.01)
  (Continued)

(52) U.S. Cl.
  CPC .......... *G10L 19/022* (2013.01); *G06F 17/147* (2013.01); *G10L 19/0212* (2013.01);
  (Continued)

(58) Field of Classification Search
  CPC ....... G10L 19/022; G10L 19/00; G10L 19/02; G10L 19/025; G10L 19/03; G10L 19/032;
  (Continued)

(56) References Cited

U.S. PATENT DOCUMENTS

| | | | |
|---|---|---|---|
| 6,124,895 A | 9/2000 | Fielde | |
| 2003/0093282 A1* | 5/2003 | Goodwin | ............ G06F 17/147 704/500 |

(Continued)

FOREIGN PATENT DOCUMENTS

| | | |
|---|---|---|
| CN | 101046964 A | 10/2007 |
| JP | 2000-132193 A | 5/2000 |

(Continued)

OTHER PUBLICATIONS

Office Action dated Feb. 20, 2017 issued in corresponding Korean patent application No. 10-2016-7007348 (15 pages with English translation).

(Continued)

*Primary Examiner* — Qi Han
(74) *Attorney, Agent, or Firm* — Haynes and Boone, LLP

(57) ABSTRACT

An apparatus for processing an audio signal including a sequence of blocks of spectral values includes: a processor for processing the sequence of blocks using at least one modification values for a first block to obtain aliasing-reduced or aliasing-free first result signal in an overlap range and using at least one second different modification value for a second block of the sequence of blocks to obtain an aliasing-reduced or aliasing-free second result signal in the overlap range; and a combiner for combining the first result signal and the second result signal in the overlap range to obtain a processed signal for the overlap range.

14 Claims, 16 Drawing Sheets

(51) Int. Cl.
*G06F 17/14* (2006.01)
*G10L 19/032* (2013.01)
*G10L 21/038* (2013.01)
*G10L 19/028* (2013.01)

(52) U.S. Cl.
CPC .......... *G10L 19/032* (2013.01); *G10L 19/028* (2013.01); *G10L 21/038* (2013.01)

(58) Field of Classification Search
CPC ............. G10L 19/03526; G10L 19/265; G10L 2019/00; G10L 19/035; G10L 19/26
USPC ........................ 704/500, 501, 502, 503, 504
See application file for complete search history.

(56) References Cited

U.S. PATENT DOCUMENTS

| | | |
|---|---|---|
| 2003/0187663 A1 | 10/2003 | Truman et al. |
| 2007/0100610 A1 | 5/2007 | Disch et al. |
| 2010/0250265 A1 | 9/2010 | Taleb |
| 2010/0283639 A1 | 11/2010 | Phillippe et al. |
| 2011/0173009 A1 | 7/2011 | Fuchs et al. |
| 2012/0245947 A1* | 9/2012 | Neuendorf .............. G10L 19/20 704/500 |
| 2012/0265541 A1 | 10/2012 | Geiger et al. |
| 2012/0271644 A1 | 10/2012 | Bessette et al. |
| 2012/0328121 A1 | 12/2012 | Truman et al. |
| 2013/0246492 A1* | 9/2013 | Helmrich .............. G10L 19/022 708/400 |

FOREIGN PATENT DOCUMENTS

| | | |
|---|---|---|
| JP | 2009-532738 A | 9/2009 |
| JP | 2011-527446 A | 10/2011 |
| JP | 2013-508765 A | 3/2013 |
| JP | 2013-508766 A | 3/2013 |
| JP | 2013507648 A | 3/2013 |
| KR | 1020110040823 A | 4/2011 |
| RU | 2421830 C2 | 9/2010 |
| RU | 2012102049 A | 7/2013 |
| TW | 200305855 A | 11/2003 |
| WO | WO 2006/137425 | 12/2006 |
| WO | WO 2007120452 A1 | 10/2007 |
| WO | WO 2008/052627 A1 | 5/2008 |
| WO | WO 2010/108895 A1 | 9/2010 |
| WO | WO 2011/048117 | 4/2011 |
| WO | WO 2011048118 A1 | 4/2011 |
| WO | WO 2011/124473 | 10/2011 |
| WO | 2012085410 A1 | 6/2012 |
| WO | WO 2012/085410 A1 | 6/2012 |

OTHER PUBLICATIONS

Marina Bosi, et al. ISO/IEC MPEG-2 advanced audio coding., Journal of the Audio engineering society, 1997, vol. 45. No. 10, pp. 789-814 (26 pages).

ISO/IEC FDIS 23003-3:2011 (E), Information technology—MPEG audio technologies—Part 3: Unified speech and audio coding. ISO/IEC JTC 1/SC 29/WG, 11. Sep. 20, 2011 (291 pages).
Dietz et al.; "Spectral Band Replication, a novel approach in audio coding," Audio Engineering Society Convention Paper 5553; presented at 112th Convention May 10-13, 2002; Munich, Germany; pp. 1-8.
Edler, Bernd; "Aliasing Reduction for Gain Control with Critically Sampled Filter Banks," First International Conference on Communications and Electronics, ICCE; Oct. 10-11, 2006; pp. 315-318.
Ekstrand, Per; "Bandwidth Extension of Audio Signals by Spectral Band Replication," Proceedings of 1st IEEE Benelux Workshop on Model based Processing and Coding of Audio (MPCA-2002); Nov. 15, 2002, Leuven, Belgium; pp. 53-58.
International Search Report in co-pending PCT Application No. PCT/EP2014/067944 dated Dec. 3, 2014 (4 pages).
ITU-T; "ITU-T G.719, Low-complexity full-band audio coding for high-quality, conversational applications," Transmission Systems and Media, Digital Systems and Networks Digital terminal equipments—Coding of analogue signals; Jun. 30, 2008, Geneva, Switzerland; pp. 1-58.
Keuch et al.; "Aliasing Reduction for Modified Discrete Cosine Transform Domain Filtering and Its Application to Speech Enhancement," 2007 IEEE Workshop on Applications of Signal Processing to Audio and Acoustics; Oct. 21-24, 2007, New Paltz, New York; pp. 131-134.
Larsen et al.; "Audio Bandwidth Extension—Application of Psychoacoustics, Signal Processing and Loudspeaker Design," John Wiley & Sons Ltd., The Atrium, Southern Gate, Chichester, West Sussex, England; 2004; pp. 1-313.
Malvar, Henrique; "A Modulated Complex Lapped Transform and its Applications to Audio Processing," IEEE International Conference on Acoustics, Speech, and Signal Processing; Mar. 1999, Phoenix, Arizona; pp. 1-9.
Virette et al.; "Adaptive time-frequency resolution in modulated transform at reduced delay," IEEE International Conference on Acoustics, Speech and Signal Processing; 2008, Piscataway, New Jersey; pp. 3781-3784 (Abstract only).
Office Action dated May 29, 2017 issued in parallel Russian patent application No. 2016110408 (with English translations) (14 pages).
Office Action dated May 23, 2017 issued in parallel Japanese Patent App. No. 2016-535500 (13 pages with English translation).
Office Action dated May 2, 2017 issued in parallel Japanese Patent App. No. 2016-535499 (7 pages with English translation).
Office Action issued in related U.S. Appl. No. 15/047,334 dated Apr. 7, 2017 (15 pages).
Decision of Grant issued in parallel Korean patent application No. 10-2016-7007348 dated Oct. 31, 2017 (5 pages with English translation).
Decision of Grant issued in parallel Russian patent application No. 2016110408 dated Nov. 16, 2017 (25 pages) with English translation).
Office Action dated Aug. 14, 2017 issued in co-pending Russian App. No. 2016110398 (5 pages with English translation).
Search Report issued with Office Action dated Aug. 14, 2017 issued in co-pending Russian App. No. 2016110398 (4 pages with English translation).
Decision to Grant issued in parallel Japanese Patent App. No. 2016-535499 dated Jan. 9, 2018 (7 pages).

* cited by examiner

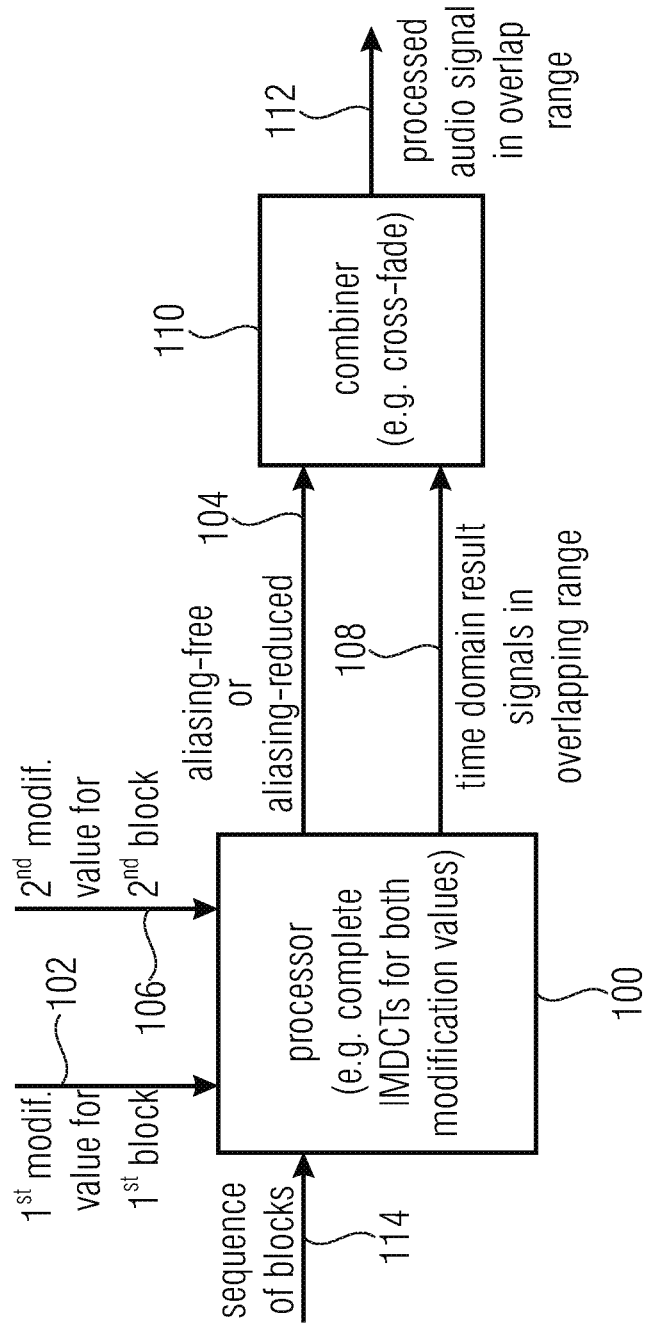

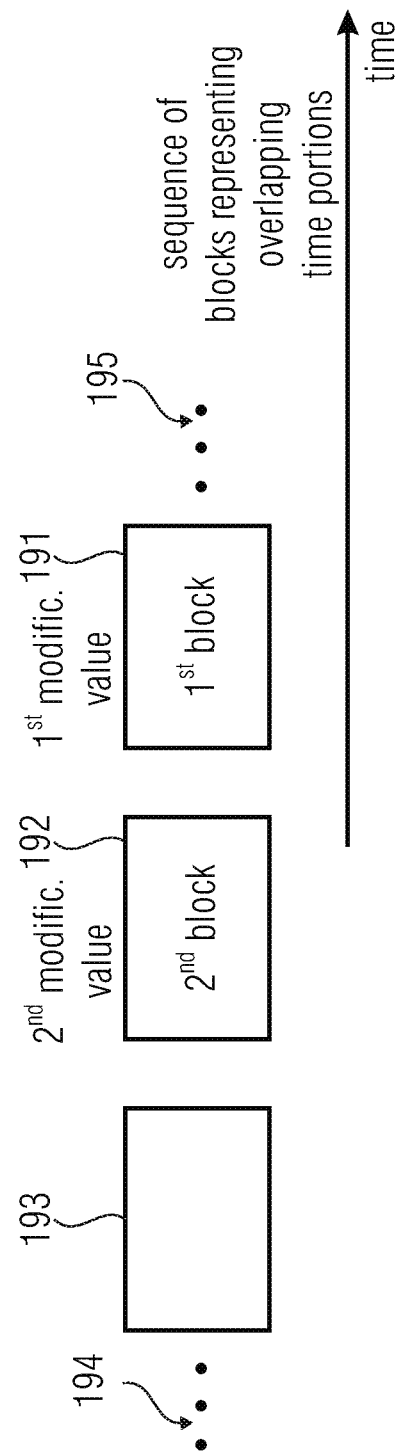

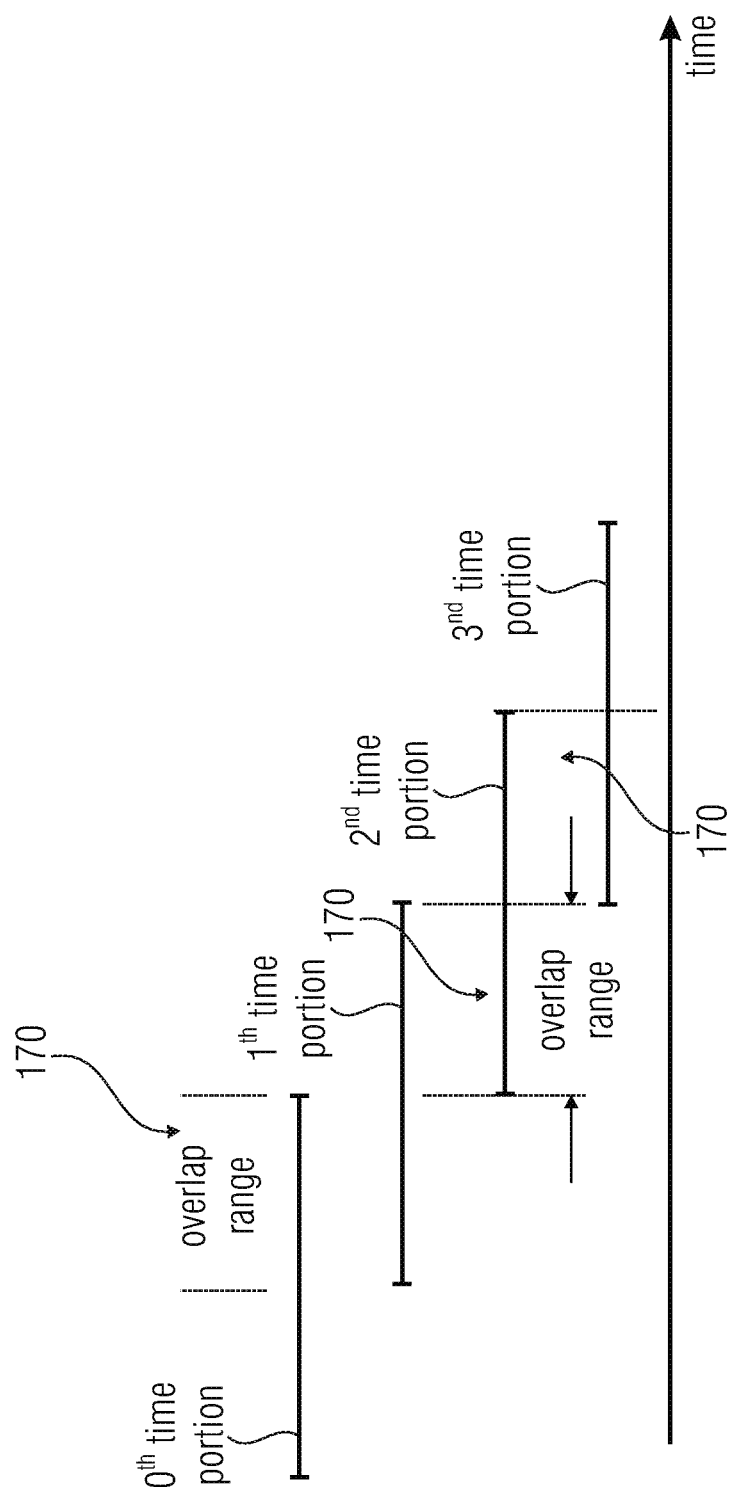

Reduction of time domain aliasing components for gain factors varying over time and frequency.

Reduction of time domain aliasing components with gain factors varying over time and frequency.

Aliasing reduction component for gain factor variation over time and frequency.

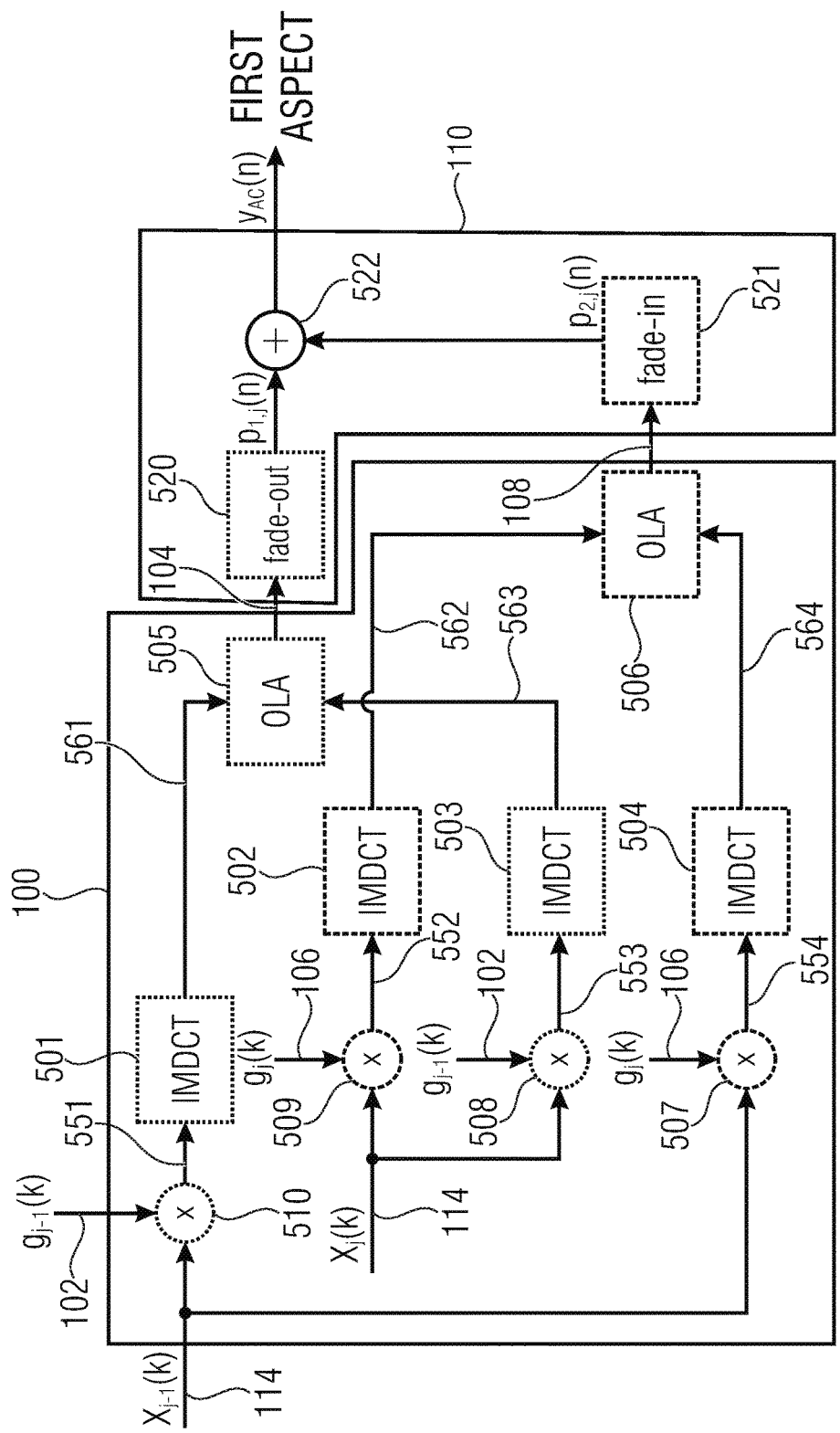

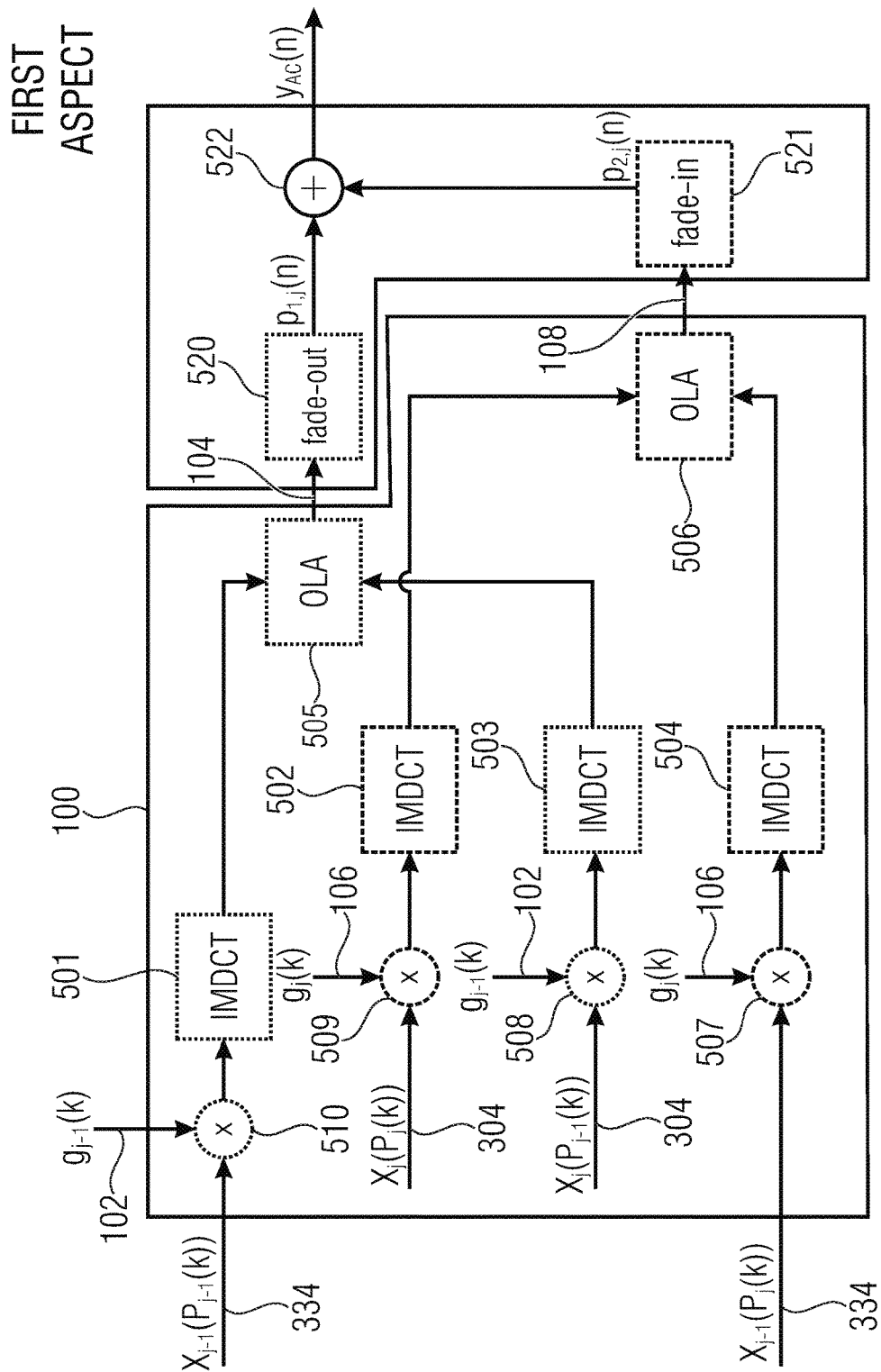
FIG 5B  Aliasing reduction for bandwidth extension with variable patching.

Aliasing term generated by reconstruction, time reversal, and windowing.

Gain factors in frame 1.

Application of gain factors prior to IMDCT processing.

Left: Output signals after forward and backward transforms.
Right: Uncancelled aliasing due to gain factor variation over time.

APPARATUS AND METHOD FOR PROCESSING AN AUDIO SIGNAL USING A COMBINATION IN AN OVERLAP RANGE

CROSS-REFERENCE TO RELATED APPLICATIONS

This application is a continuation of copending International Application No. PCT/EP2014/067944, filed Aug. 22, 2014, which is incorporated herein by reference in its entirety, and additionally claims priority from European Application No. 13181507.8, filed Aug. 23, 2013, which also is incorporated herein by reference in its entirety.

BACKGROUND OF THE INVENTION

The present invention is related to audio processing, and particularly audio processing in the context of aliasing affected processing of audio signals.

In normal operation, the Modified Discrete Cosine Transform (MDCT) has features which make it a well suited tool for audio coding applications. It generates a critically sampled spectral signal representation from overlapping frames and provides perfect reconstruction. This means that the input signal can be reconstructed from spectral coefficients of a forward transform by applying the backward transform and an overlap-add operation in the overlap regions. However, if additional processing is applied on the spectral coefficients, the MDCT has some drawbacks in comparison to oversampled representations like DFT based overlapped processing. Even relatively simple time and frequency dependent gain control, such as used for dynamic range control or clipping prevention can produce unwanted side effects. Therefore, DFT based separate post-processing to audio decoding is applied in several applications which necessitate this kind of signal modification, although an MDCT based spectral representation would be available inside the decoder. One drawback besides computational complexity is the additional delay introduced by such a post-processing.

A common approach for MDCT time domain aliasing reduction is to recreate an oversampled modulated complex lapped transform (MCLT). The MCLT results from combining the MDCT with its complex counterpart, the Modified Discrete Sine Transform (MDST). The MCLT offers similar features like a DFT representation of a signal and therefore its robustness against time domain aliasing (TDA) due to spectral manipulation is comparable to the DFT representation. But unfortunately calculating the MDST spectrum out of the MDCT spectrum is computationally very complex and produces a significant signal delay. Hence, the state-of-the-art provides techniques for reducing both delay and complexity (see Kuech, F.; Edler, B., "Aliasing Reduction for Modified Discrete Cosine Transform Domain Filtering and its Application to Speech Enhancement," in *IEEE Workshop on Applications of Signal Processing to Audio and Acoustics*, 21-24 Oct. 2007; and Edler, B., "Aliasing Reduction for Gain Control with Critically Sampled Filter Banks," in *First International Conference on Communications and Electronics*, ICCE '06, 10-11 Oct. 2006). In these approaches a real-to-complex (R2C) transform is used to approximate the necessitated MDST values. Then in the MCLT domain the manipulation of the spectral coefficients is applied. Afterwards, the complex values are transformed into the MDCT domain again using a complex-to-real (C2R) transform. Although this approach delivers good results in terms of aliasing robustness, it has some disadvantages. First, the MDST coefficients are estimated and their accuracy is defined by the amount of computational complexity. Second, the transform chain R2C-C2R produces still delay.

SUMMARY

According to an embodiment, an apparatus for processing an audio signal including a sequence of blocks of spectral values may have: a processor for processing the sequence of blocks using at least one modification value for a first block to obtain aliasing-reduced or aliasing-free first result signal in an overlap range and using at least one second different modification value for a second block of the sequence of blocks to obtain an aliasing-reduced or aliasing-free second result signal in the overlap range; and a combiner for combining the first result signal and the second result signal in the overlap range to obtain a processed signal for the overlap range, wherein the processor may have: a modifier for modifying the first block of the sequence using the at least one first modification value to obtain a first modified block, for modifying the second block of the sequence using the at least one second modification value to obtain a second modified block, for modifying the second block using the second at least one first modification value to obtain a third modified block and for modifying the first block using the at least one second modification value to obtain a fourth modified block; a spectrum-time converter for converting the first to fourth modified blocks into a corresponding time representation; and an overlap-adder for overlap-adding time representations of the first and third modified blocks to obtain the first result signal and for overlap-adding time representations of the second and fourth modified blocks to obtain the second result signal.

According to another embodiment, a method for processing an audio signal including a sequence of blocks of spectral values may have the steps of: processing the sequence of blocks using at least one modification value for a first block to obtain aliasing-reduced or aliasing-free first result signal in an overlap range and using at least one second different modification value for a second block of the sequence of blocks to obtain an aliasing-reduced or aliasing-free second result signal in the overlap range; and combining the first result signal and the second result signal in the overlap range to obtain a processed signal for the overlap range, wherein the processing may have the steps of: modifying the first block of the sequence using the at least one first modification value to obtain a first modified block, modifying the second block of the sequence using the at least one second modification value to obtain a second modified block, modifying the second block using the second at least one first modification value to obtain a third modified block, modifying the first block using the at least one second modification value to obtain a fourth modified block, converting the first to fourth modified blocks into a corresponding time representation; overlap-adding time representations of the first and third modified blocks to obtain the first result signal and overlap-adding time representations of the second and fourth modified blocks to obtain the second result signal.

Another embodiment may have a non-transitory digital storage medium having computer-readable code stored thereon to perform, when said storage medium is run by a computer or a processor, the inventive method.

In an aspect of the present invention, an apparatus for processing an audio signal comprising a sequence of blocks of spectral values comprises a processor for processing the sequence of blocks of spectral values using at least one modification value for a first block to obtain an aliasing reduced or aliasing free first result signal in an overlap range and using at least one second different modification value from a second block of the sequence of blocks of spectral values to obtain aliasing reduced or aliasing free second result signal in the overlap range. Then, both signals in the overlap range, both of which constitute a certain representation of one of the same signal portion, are combined to obtain the processed signal for the overlap range.

Advantageously, this combination relies on a cross-fade from one result signal to the other result signal, i.e., a fadeout of the first result signal and concurrently a fade-in of the second result signal.

Advantageously, the processor comprises a modifier for modifying the first block of the sequence using the at least one first modification value to obtain a first modified block, for modifying the second block of the sequence using at least one second modification value to obtain a second modified block, for modifying the second block using the at least one first modification value to obtain a third modified block and for modifying the first block using the at least one second modification value to obtain a fourth modified block. A spectral-time converter is configured for converting the first to fourth modified blocks into time representations thereof and an overlap-adder for overlap-adding the first and third modified blocks to obtain a result signal and for overlap-adding time representations of the second and fourth modified blocks to obtain the second result signal is provided. Hence, basically two parallel inverse transform operations are performed, one with the first gain modification value and one with the second gain modification value.

When the gain modification value is only time-variant, i.e., is constant all over the frequency range, then only a single gain modification value is used for the modification of a block. However, if the gain modification value varies over frequency, then each block of spectral values is modified with a plurality of gain modification values. A gain modification value can apply to each individual spectral value or to a group of spectral values, such as 2, 3, 4 or 5 frequency-adjacent spectral values. In the general case, however, a single gain modification value can exist for each and every spectral line, a block of spectral values is modified with a number of gain modification values where the number is equal to the number of spectral values in the block of spectral values.

Hence, in accordance with this aspect, two aliasing-reduced or aliasing-free output signals are generated for the overlap region and then a cross-fade is performed between those two outputs or result signals.

In accordance with a further aspect of the present invention, an apparatus for processing an audio signal comprises a processor for calculating an aliasing-affected signal using at least one first modification value for a first block of the sequence and at least one second different modification value for a second block of the sequence of blocks of spectral values. Then, an aliasing error signal is estimated where this aliasing error signal is included in the aliasing-affected or aliasing-subjected audio signal. Then, the aliasing-affected signal and the aliasing error signal are combined such that the signal obtained by the combining is an aliasing-reduced or aliasing-free signal.

In other words, the other aspect relies on the calculation of an aliasing-affected signal and an aliasing error signal and a subsequent combination of both signals in order to obtain the aliasing-reduced or aliasing-free signal. Advantageously, the aliasing is canceled by a reconstruction of the input signal in an overlap region by an additional frequency-time transform with equal gains for both blocks, a multiplication with a window-function or a related function, a time reversal, a multiplication with a gain difference between the two gain or modification values and a subtraction from the output of the processing with the different gain.

Advantageously, the transform algorithm used is a modified discrete cosine transform MDCT and the reverse transform operation is an inverse modified discrete cosine transform. Alternatively, other such aliasing-introducing transforms can be used such as an MDST (modified discrete sine transform) or an inverse modified discrete sine transform (IMDST) or any other such transform, in which on the analysis side a number of samples in a time portion is greater than a number of spectral values or alternatively stated, in which there is an overlap region between two subsequent time portions resulting in two subsequent blocks of spectral values, i.e. in blocks of spectral values which are subsequent in time. Here, both blocks of spectral values are related at least partly to one and the same overlap region, i.e., the overlap region between those two time portions which have finally resulted in the two time-subsequent blocks of spectral values. This means that on the analysis side the number of time domain samples in a block of samples or a frame is greater than the number of frequency domain values in a frequency domain representation block, and on the synthesis side the number of synthesized time domain samples is greater than the number of spectral values in a block used for synthesizing overlapping blocks of time domain samples.

However, as a final stage on the synthesis side, an overlap-add processing is performed so that, in the end, a number of samples in the overlap range are lower than the number of time domain samples in a synthesized frame and is equal to the number of spectral values of a block of spectral values. In the latter case, a critically sampled transform is obtained and such transforms are advantageous for the present invention, but the present invention can also be applied to non-critically sampled transforms although these transforms have some kind of additional overhead compared to critically sampled transforms.

The inventive aspects are not only useful for compensating aliasing due to time-frequency varying gain modification, but also for bandwidth extension (BWE). In this use-case the replicated spectrum produced by the copy-up stage of the BWE algorithm has to be shaped with a spectral envelope to match the original spectral envelope as close as possible (see E. Larsen and R. M. Aarts, Audio Bandwidth Extension—Application to Psychoacoustics, Signal Processing and Loudspeaker Design. John Wiley & Sons, Ltd, 2004; M. Dietz, L. Liljeryd, K. Kjoerling and O. Kunz, "Spectral Band Replication, a novel approach in audio coding," in 112*th AES Convention*, Munich, May 2002; and P. Ekstrand, "Bandwidth Extension of Audio Signals by Spectral Band Replication," in *Proceedings of 1st IEEE Benelux Workshop on MPCA*, Leuven, November 2002. This spectral envelope is in general both time and frequency dependent. Although in most of the state-of-the-art BWE techniques the copy-up scheme is constant, it is possible to perform a time varying copy-up which leads to additional aliasing. The new proposed aliasing cancelation technique is also able to handle these BWE artifacts.

BRIEF DESCRIPTION OF THE DRAWINGS

Embodiments of the present invention will be detailed subsequently referring to the appended drawings, in which:
FIG. 1A is an embodiment of a first aspect.

FIG. 1C is a schematic representation of a sequence of blocks of spectral values;

FIG. 1D is a schematic representation of the sequence of overlapping time portions resulting in the sequence of blocks of FIG. 1c;

FIG. 5A illustrates an embodiment of the first aspect;

FIG. 5B illustrates an embodiment of the second aspect;

DETAILED DESCRIPTION OF THE INVENTION

Figure 1B:
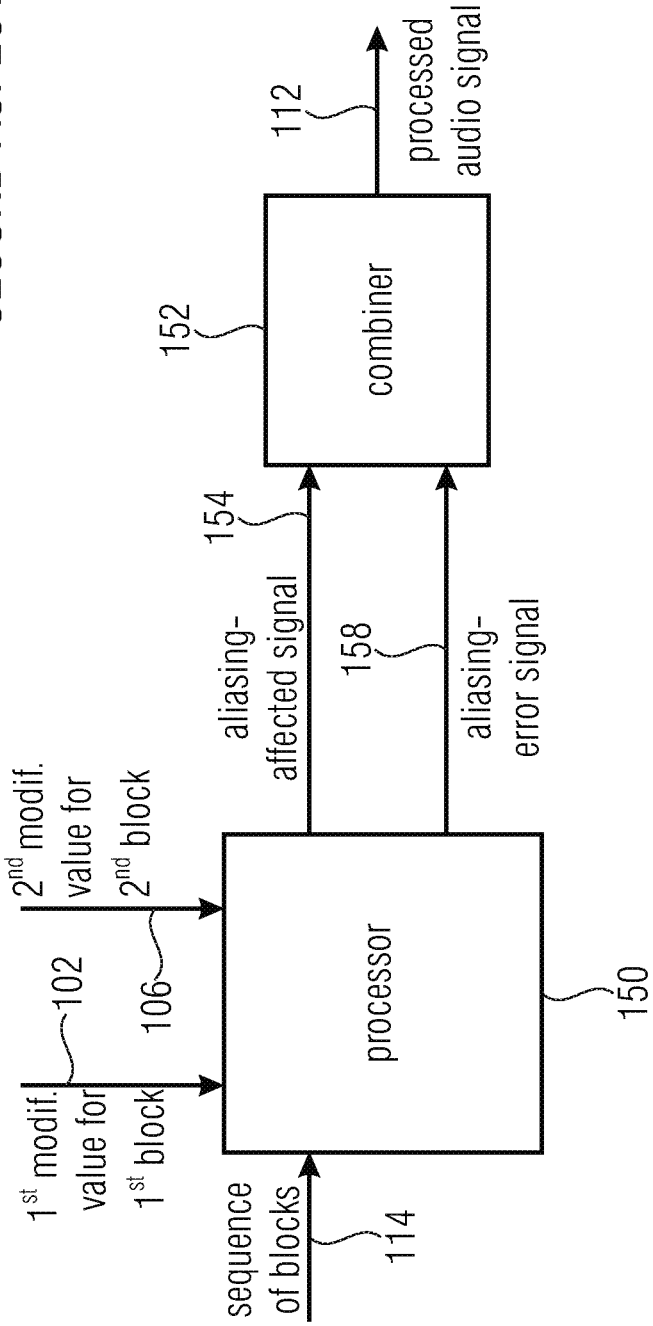
FIG. 1B is an embodiment of a second aspect.

FIG. 1a illustrates an apparatus for processing an audio signal comprising a sequence of blocks of spectral values in accordance with the first aspect. The apparatus for processing comprises a processor 100 for processing the sequence of blocks of spectral values using at least one modification value 102 for a first block to obtain an aliasing-reduced or aliasing-free first result signal 104. The processor furthermore processes the second block of the sequence of blocks, which is following the first block in time or which precedes the first block in time and which is immediately adjacent to the first block using at least one second different modification value, i.e. a second modification value, which is different from the first modification value to obtain an aliasing-reduced or aliasing-free second result signal 108 in an overlapping range. Hence, the processor generates two aliasing-free or at least aliasing-reduced time domain signals for the same overlapping range. These signals 104 and 108 are input into a combiner 110 for combining the first and the second result signals in the overlap range to obtain a processed signal 112 for the overlap range. Advantageously, the processor is configured for generating two aliasing-free output signals for the overlap region and then performs a cross-fade between those two aliasing-free output signals. One implementation for the processor to achieve this is the provision of a complete inverse transform processing, such as an IMDCT processing for both blocks or both different modification values for the blocks. In other words, the processor generates a complete IMDCT processing for the overlap range of the first block using the first modification value for the first block and the second block. Furthermore, the processor performs a complete IMDCT processing for the first and the second block, but now using the second modification value for both blocks. Both of these complete IMDCTs processing operations result in the two aliasing-free or at least aliasing-reduced time domain result signals in the overlapping range, which are then combined by the combiner.

Subsequently, a second aspect is discussed in the context of FIG. 1b. FIG. 1b illustrates an apparatus for processing an audio signal comprising a sequence of blocks of spectral values in accordance with an embodiment of the present invention with respect to the second aspect. The apparatus comprises a processor 150 for calculating an aliasing-affected signal 154 using at least one first modification value 102 for the first block of the sequence 114 of blocks of spectral values and using at least one different second modification value 106 for a second block of the sequence 114 of blocks of spectral values. The processor is configured for estimating, in addition to the aliasing-affected signal 154, an aliasing-error signal 158. Furthermore, the apparatus comprises a combiner 152 for combining the aliasing-affected signal and the aliasing-error signal such that a processed audio signal 112 obtained by the combining by the combiner 152 is an aliasing-reduced or aliasing-free signal.

Specifically, in accordance with the second aspect illustrated in FIG. 1b, the processing is performed using the different modification values for the blocks pertaining to the same overlapping range which results in the aliasing-affected signal 154. However, in contrast to conventional technology, where this aliasing-affected signal is used for further processing and the aliasing-induced error is tolerated, this is not done in the present invention. Instead, the processor 150 additionally calculates an aliasing error signal 158, the aliasing-error signal is then combined with the aliasing-affected signal typically by subtracting or generally a weighted linear combining so that the processed audio signal is aliasing free, but even when the combination or the specific aliasing-error signal is not completely accurately calculated, the combining nevertheless results in a processed audio signal having less aliasing error than the aliasing-affected signal 154.

In many applications it is desirable to modify the spectral coefficients by applying gain factors to them before feeding them to the IMDCT, so that:

$$Y_j(k)=g_j(k)\cdot X_j(k)$$

with $X_j(k)$ being the MDCT spectrum of the j-th frame, k being the frequency index, $g_j(k)$ being a time and frequency dependent spectral weighting function and $Y_j(k)$ being the filtered MDCT spectrum. This application of gain factors also is shown in FIG. 8.

Figure 8:
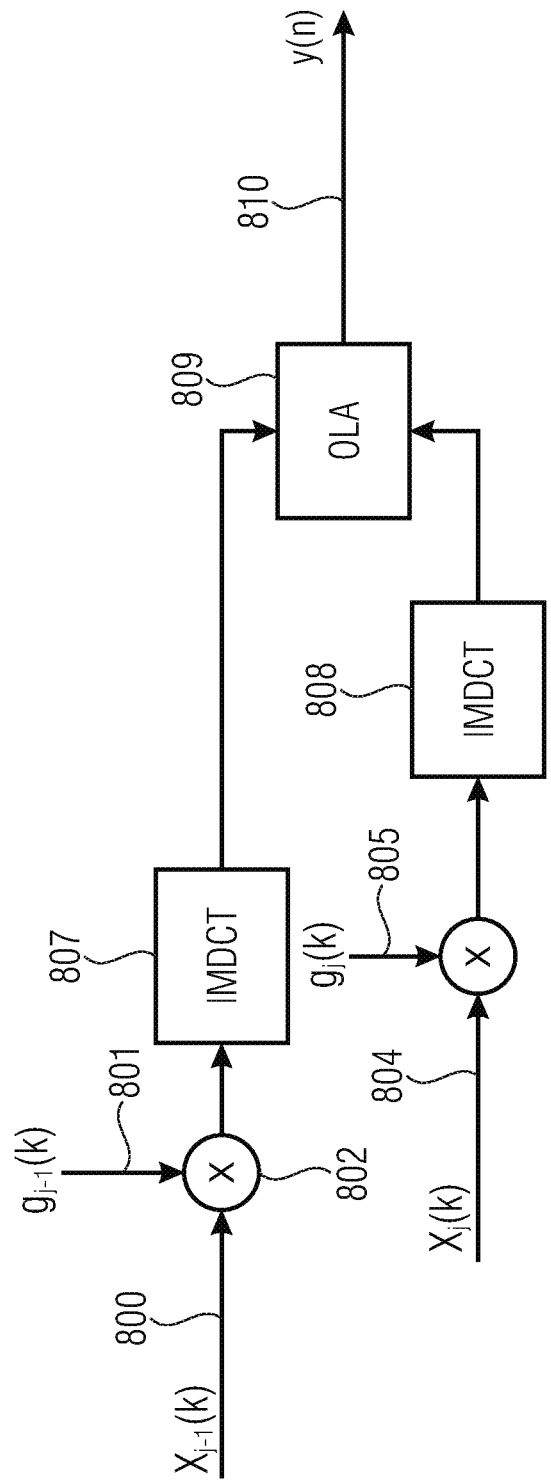
FIG. 8 illustrates an application of gain factors prior to an inverse MDCT processing.

In particular, FIG. 8 illustrates a typical conventional MDCT synthesis system, in which the spectral values of a preceding block 800 having a time index j−1 is multiplied by the at least one gain factor $g_{j-1}$ by a multiplier 802. Furthermore, the current block 804 with the time index j is multiplied or modified by a gain factor $g_j$ for the current block indicated at 805. Specifically, the gain factor 801 for the preceding block with the time index j−1 indicated at 801 and the gain factor $g_j$ for the current block 805 are different from each other. Furthermore, as outlined in FIG. 8, the gain factor can be frequency dependent. This is illustrated by the frequency index k. Hence, each spectral value with the index k is multiplied by the corresponding first or second gain factor 801, 805 depending on which block 800 or 804 the gain factor belongs to. Hence, due to the fact that the gain factors for the two blocks are time-variant and/or frequency-variant, an aliasing error results in the processing when the processing in FIG. 8 is applied. This processing consists of an IMDCT operation 807 for the preceding block 800 and a further IMDCT operation 808 for the current block 804. The IMDCT operation consists of a frequency time transform and a subsequent fold-out operation as will be further discussed in the context of FIG. 2b. Then, an overlap-add processing which additionally comprises, before the actual adding together, a synthesis windower is performed by block 809 in order to finally obtain an aliasing-affected signal y(n) indicated at 810. Hence, the aliasing-affected signal 810 typically can be exactly the same as the aliasing-affected signal illustrated at 154 in FIG. 1B.

Figures 9A, 9B:
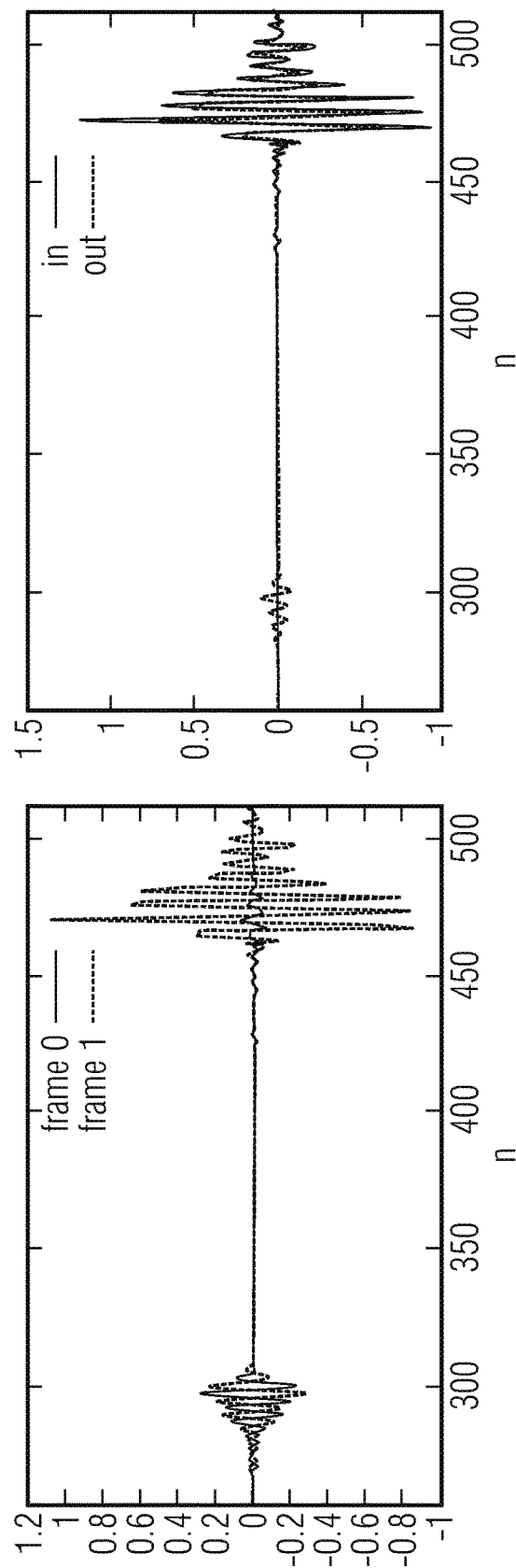
FIGS. 9A and 9B illustrate signals related to the processing of FIG. 8.

If the gains in two subsequent frames are different, the aliasing terms do not cancel each other anymore, as can be seen in FIG. 9B (right), where the gain factors are constant over frequency, but not over time. In this example they are $g_0(k)=1$ and $g_1(k)=0.7$, so that the remaining aliasing component is the aliasing from frame 0 multiplied by a factor of 0.3.

It should be noted that for such a simple case, which was mainly chosen for illustration, frequency domain processing would not be necessitated, since a similar effect could be achieved without aliasing problems by applying a suitable temporal envelope. However this example helps to explain the basic idea of the aliasing reduction scheme. Here, the remaining aliasing component is the time reversed and windowed input signal multiplied by the difference of the two gain factors, which is in our example 0.3. Therefore, the aliasing can be cancelled by the following steps:
  reconstruction of the input signal in the overlap region by additional IMDCT with equal gains for the two blocks;
  multiplication with the function $w(n) \cdot w(N+n)$;
  time reversal;
  multiplication with the gain difference 0.3; and
  subtraction from the output of the processing with different gain.

Figure 6:
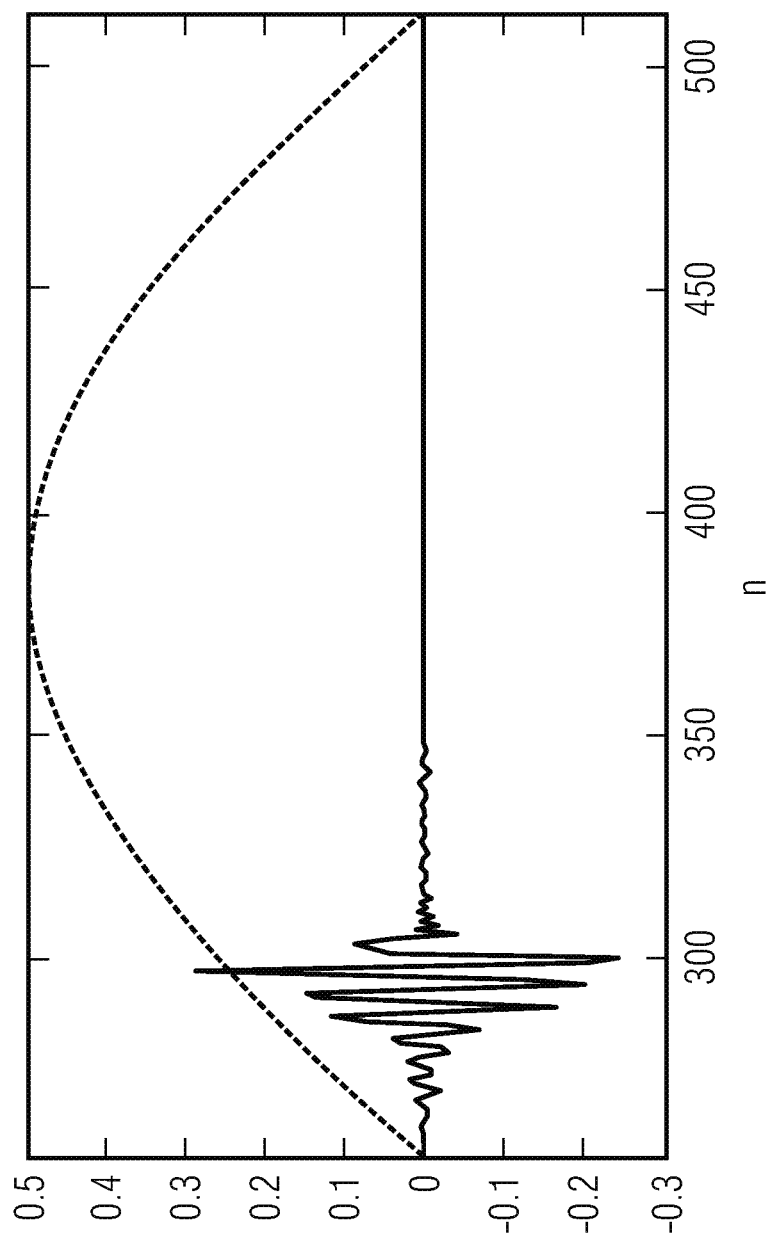
FIG. 6 illustrates an aliasing term generated by reconstruction, time reversal and windowing related to the second aspect.

The output of the first three steps is illustrated in FIG. 6.

In the first aspect, two aliasing free output signals for the overlap region are calculated and then a cross-fade is performed between them. FIG. 5A shows a block diagram of an embodiment.

The first signal $p_{1,j}(n)$ is obtained from IMDCT processing of the two affected frames with the spectral coefficients $X_{j-1}(k)$ and $X_j(k)$ with equal sets of gain factors $g_{j-1}(k)$. The time domain aliasing components of the two frames cancel each other, since there are no gain differences. The second signal $p_{2,j}(n)$ is generated accordingly from $X_{j-1}(k)$ and $X_j(k)$, but now using gain factors $g_j(k)$. The variation of the spectral shape can now be obtained by performing a cross-fade from $p_{1,j}(n)$ towards $p_{2,j}(n)$ within the overlap region:

$$y(jN+n)=f(n) \cdot p_{1,j}(n)+(1-f(n)) \cdot p_{2,j}(n)$$

with f(n) being typically monotonously decreasing from 1 to 0 in the interval $0 \leq n < N$. For the case $f(n)=1-w^2(n)$, it can be shown that both approaches produce exactly the same output (see Appendix for details). The freedom to choose cross-fade functions independent from the MDCT window, however, gives a benefit for this approach, which is illustrated in FIG. 5A.

As for the pure gain variation, a second procedure can reduce the aliasing components by generating two aliasing free signals and performing a cross-fade. Here, each of the two signals is obtained by using equal patching and equal gain factors in the two corresponding frames (see FIG. 5B). No special distinction needs to be made for constant and fixed patching. Constant patching would just infer equal mapping $P_j(k)=P(k)$ for all frames.

Figure 7:
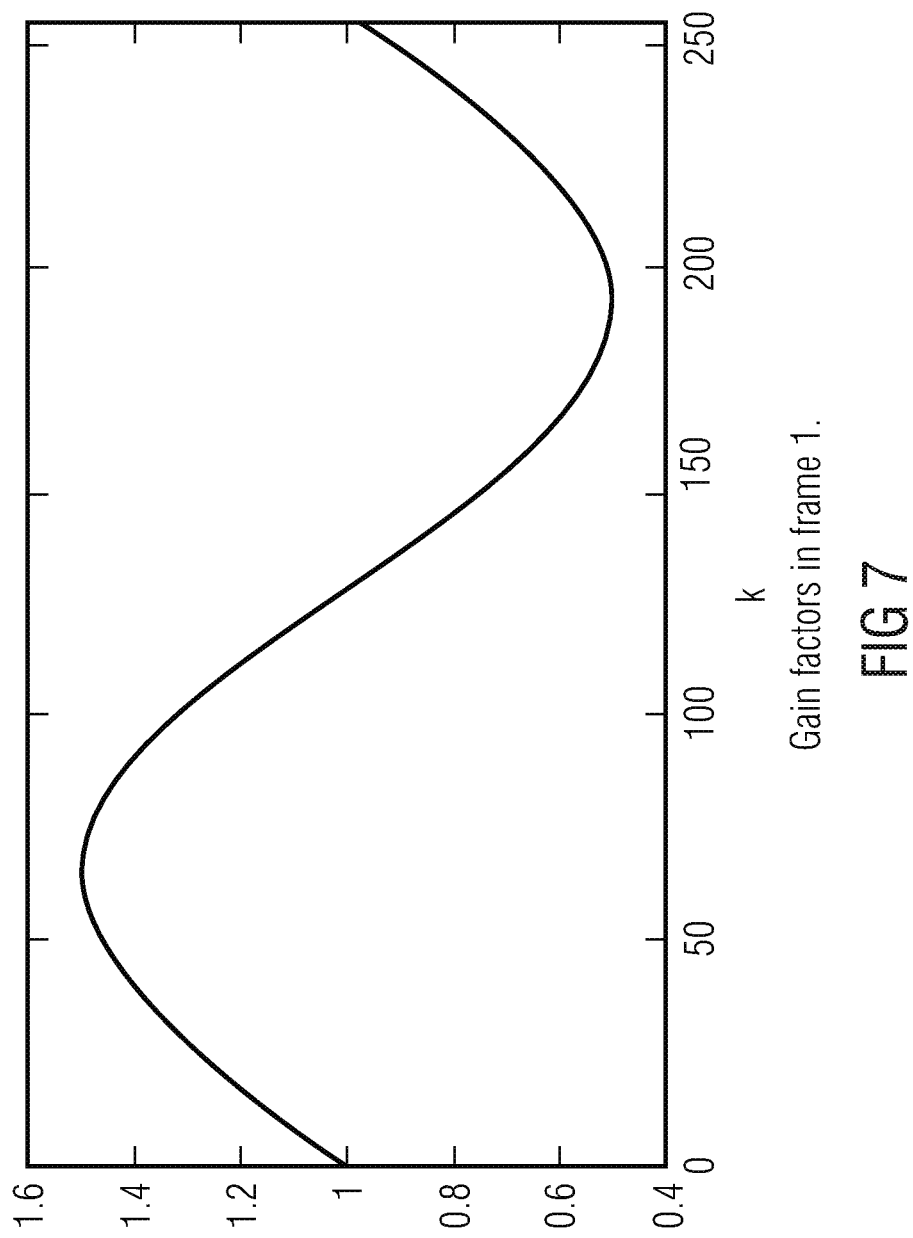
FIG. 7 illustrates varying gain factors in a frame.

The processing gets more complicated, if the gain factors not only vary over time, but also over frequency. In this case, a replacement by a temporal envelope is no longer possible, and the generation of the time reversed input signal also does not provide a suitable signal for the reduction of the aliasing component. This is illustrated in the following example, in which the gains in the first frame are constant over frequency again ($g_0(k)=1$), but in the second frame $g_1(k)$ varies as shown in FIG. 7.

This leads to an un-cancelled aliasing component, which however has a different shape than that shown in FIG. 9B (right). As seen in the first example, the gain differences are causing un-cancelled aliasing components. Therefore, the procedure shown in FIG. 3A.

Figure 3A:
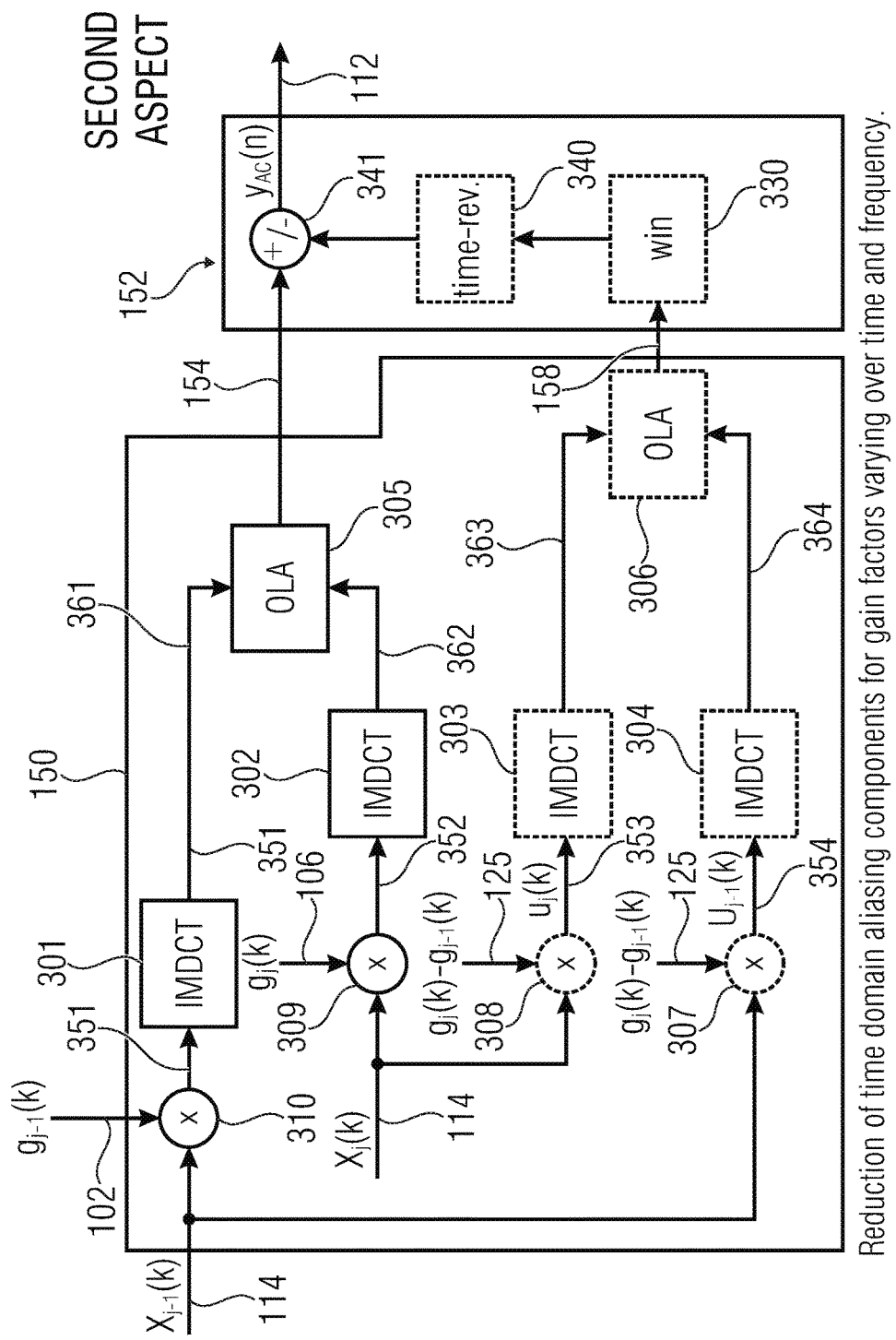
FIG. 3A illustrates a further embodiment of the second aspect.

The aliasing reduction is performed by the following steps illustrated in FIG. 3A:
  generate additional spectral coefficients by weighting (307, 308) the original coefficients by the gain differences:

$$U_{j-1}(k)=(g_j(k)-g_{j-1}(k)) \cdot X_{j-1}(k)$$

$$U_j(k)=(g_j(k)-g_{j-1}(k)) \cdot X_j(k);$$

reconstruction (303, 304, 306) of the input signal in the overlap region by additional IMDCT with $U_{j-1}(k)$ and $U_j(k)$;
  multiplication (330) with the function $w(n) \cdot w(N+n)$;
  time reversal (340); and
  combination such as addition or subtraction to the output of the processing with different gain.

The order of the gain difference term $(g_j(k)-g_{j-1}(k))$ determines if the output of the time reversal has to be added or subtracted from the regular IMDCT output for the specifically illustrated MDCT implementation. For other MDCT implementations, the signs can be different:

$$(g_j(k)-g_{j-1}(k)):$$

add the output of the time reversal to the regular IMDCT output.

$$(g_{j-1}(k)-g_j(k)):$$

subtract the output of the time reversal from the regular IMDCT output.

Hence, for the above-described embodiment and for the illustrated case in FIG. 3A, in which $(g_j(k)-g_{j-1}(k))$ is illustrated, the combiner 341 is to be implemented as an adder adding both inputs.

It is to be noted that the necessitated signs can be different for different implementations of the lapped transforms. There are for example at least four embodiments for the oddly stacked MDCT. Furthermore, there are further embodiments for an evenly stacked MDCT or an ELT with multiple overlap. For the oddly stacked MDCT, the signs for the correction terms are different. Hence, the combining performed in block 341 can comprise an addition or a subtraction.

Figure 4:
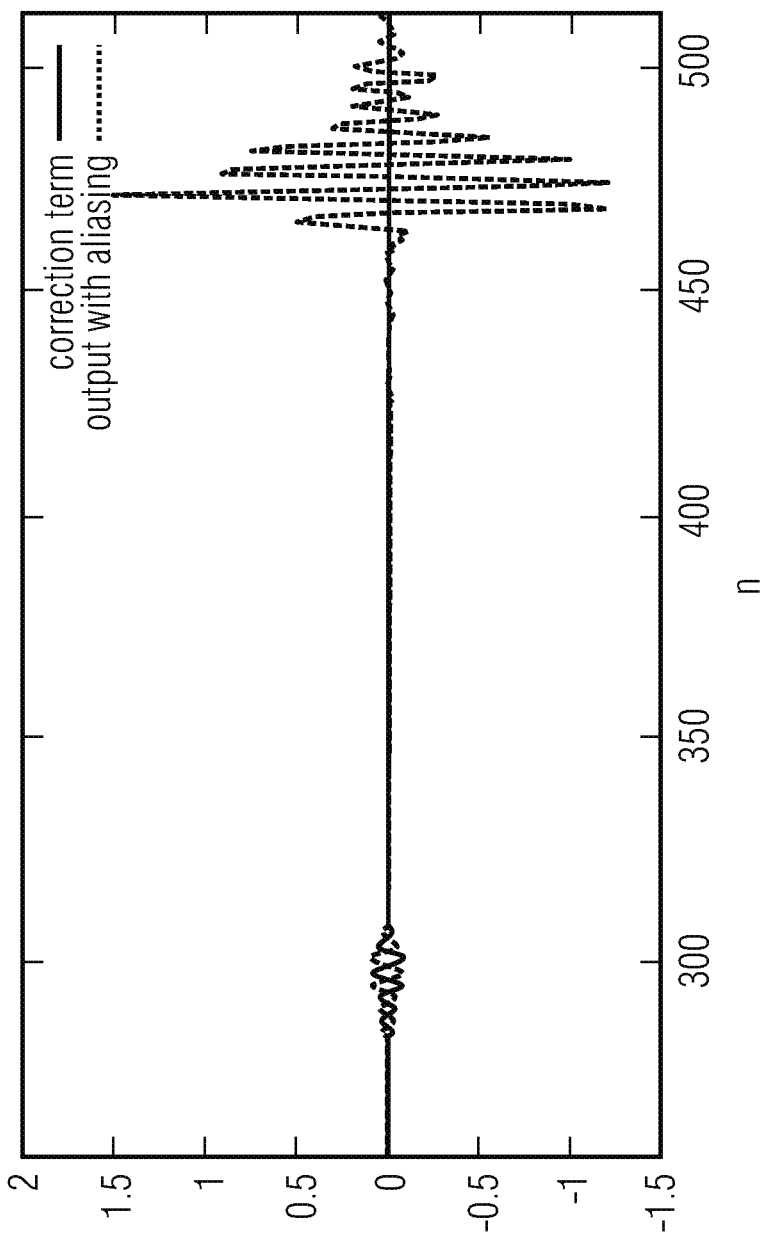
FIG. 4 illustrates an aliasing error component for the second aspect.

The aliasing correction term for the current example is shown together with the aliased IMDCT output in FIG. 4.

The copy-up stage of a BWE algorithm is described by a mapping function P(k). For copying the lower half of the spectral coefficients to the upper half, it would be as follows:

$$P(k) = \begin{cases} k & \text{for } 0 \leq k < N/2 \\ k-N/2 & \text{for } N/2 \leq k < N \end{cases}$$

The gain function would be constant and equal to 1 in the lower half:

$$g_j(k)=1 \text{ for } 0 \leq k < N/2$$

If the gain factors would vary in the upper half of the spectrum, un-cancelled aliasing would occur again. However, the aliasing reduction could be performed exactly in the same way as described in the first approach described above with the only difference that the patching also has to be taken into account in the generation of the compensation signal. This can be accomplished by using the mapped spectral coefficients as they are fed to the IMDCT and weighting them appropriately with gain differences. In this case, all gain differences in the lower half would be zero.

More advanced bandwidth extension could apply patching which varies from frame to frame. This can be described by defining an individual mapping function $P_j(k)$ for each frame. In this case the aliasing reduction has to take into account that different components may be copied to the same frequency index in the two frames influencing the common overlap region. This has to be considered in the generation of the aliasing reduction component. For this purpose, the patch in the first frame is treated as above having a gain of $g_{j-1}(k)$ in frame $j-1$ and 0 in frame j, and the patch in frame j is assumed to have a gain of 0 in frame $j-1$ and $g_j(k)$ in frame j. The resulting spectral coefficients for the generation of the aliasing reduction signal are as follows:

$$U_j(k) = -g_{j-1}(k) \cdot X_{j-1}(P_{j-1}(k)) + g_j(k) \cdot X_{j-1}(P_j(k))$$

$$U_{j-1}(k) = -g_{j-1}(k) \cdot X_j(P_{j-1}(k)) + g_j(k) \cdot X_j(P_j(k))$$

Figure 3B:
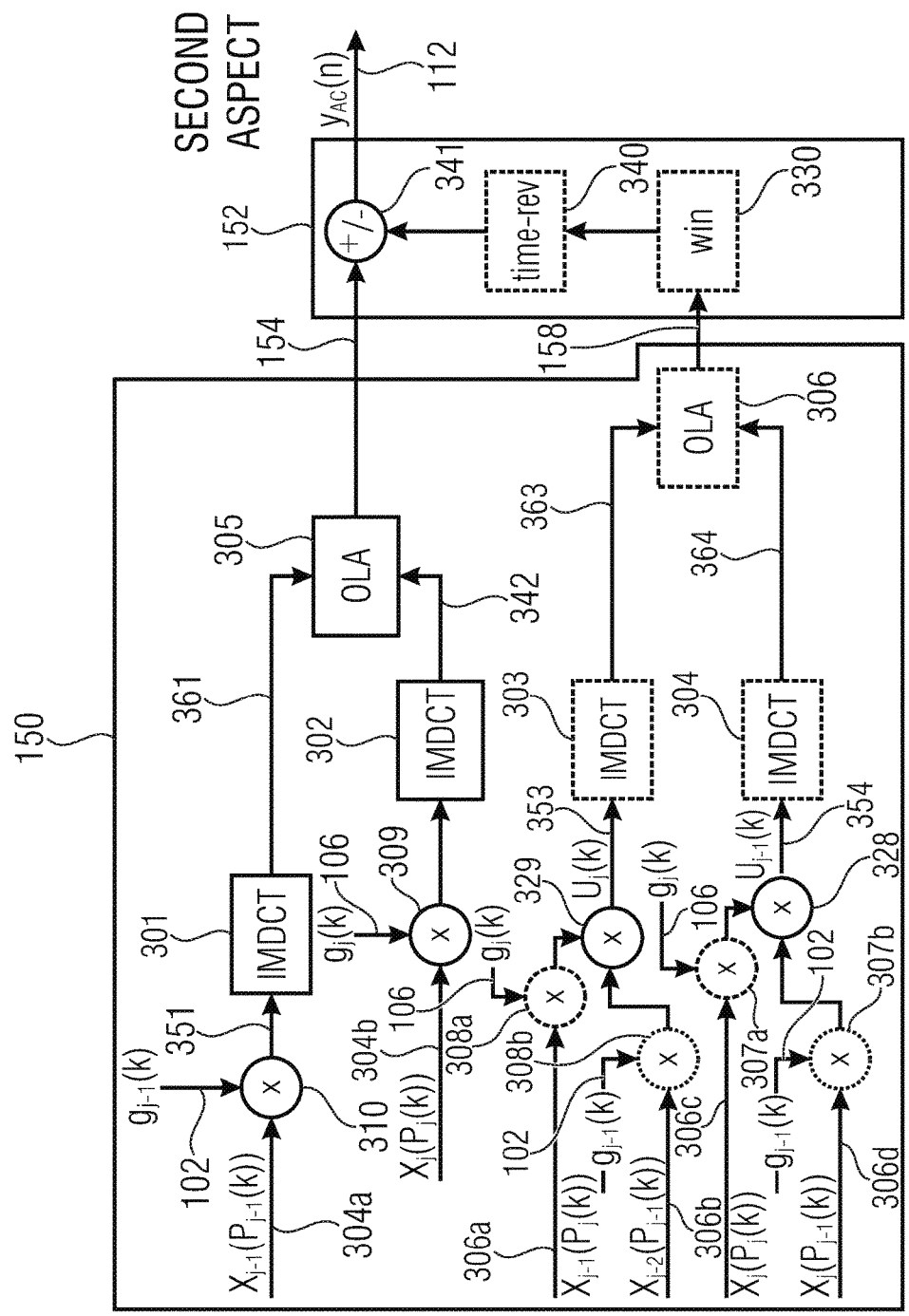
FIG. 3B illustrates a further embodiment of the second aspect.

The block diagram for this configuration is shown in FIG. 3B.

In the following section, the two aspects in FIG. 3A as well as in FIGS. 5A and 5B are discussed in more detail regarding similarities.

The MDCT with a frequency resolution of N spectral coefficients of a frame $x_j(n)$ of 2N samples starting at sample position jN is defined by:

$$X_j(k) = \sqrt{\frac{2}{N}} \sum_{n=0}^{2N-1} w(n) x_j(n) \cos\left(\frac{\pi}{N}\left(n + \frac{N}{2} + \frac{1}{2}\right)\left(k + \frac{1}{2}\right)\right), \ 0 \le k < N$$

with w(n) being a window function of length 2N, k being the frequency index, n being the sample index in the time domain. The frame $x_j(n)$ of the time signal x(n) is defined as:

$$x_j(n) = x(jN+n), 0 \le n < 2N$$

An intermediate output frame $\tilde{y}_j(n)$, $0 \le n < 2N$ is obtained from spectral components $Y_j(k)$ with the backward transform:

$$\tilde{y}_j(n) = \sqrt{\frac{2}{N}} w(n) \sum_{k=0}^{N-1} Y_j(k) \cos\left(\frac{\pi}{N}\left(n + \frac{N}{2} + \frac{1}{2}\right)\left(k + \frac{1}{2}\right)\right),$$
$$0 \le n < 2N.$$

The final output of the inverse MDCT (IMDCT) processing is calculated by adding overlapping segments:

$$y(jN+n) = \tilde{y}_{j-1}(N+n) + \tilde{y}_j(n)$$

With the abbreviation $$c_k(x) = \cos\left(\frac{\pi}{N}\left(k + \frac{1}{2}\right)x\right)$$

and with the window conditions $$w(N-1-n) = w(N+n)$$

and $$w^2(n) = 1 - w^2(N+n)$$

the output of the IMDCT in the overlap region after application of the gain factors is:

$$y(n) = \sum_{k=0}^{N-1} y_k(n)$$

with $$y_k(n) =$$
$$w(N+n)g_{j-1}(k)c_k\left(n + \frac{3N}{2} + \frac{1}{2}\right)X_{j-1}(k) + w(n)g_j(k)c_k\left(n + \frac{N}{2} + \frac{1}{2}\right)X_j(k)$$

The aliasing correction term of the second aspect described with respect to FIGS. 1B and 3A after overlap-add, windowing and time reversal is:

$$r(n) = \sum_{k=0}^{N-1} r_k(n)$$

with $$r_k(n) = w(n)w(N+n)\left[w(n)(g_{j-1}(k) - g_j(k))c_k\left(\frac{5N}{2} - n - \frac{1}{2}\right)X_{j-1}(k) + \right.$$
$$\left. w(N+n)(g_{j-1}(k) - g_j(k))c_k\left(\frac{3N}{2} - n - \frac{1}{2}\right)X_j(k)\right]$$

The cosine terms have the following symmetries:

$$c_k\left(\frac{5N}{2} - n - \frac{1}{2}\right) = c_k\left(\frac{3N}{2} + n + \frac{1}{2}\right)$$

$$c_k\left(\frac{3N}{2} - n - \frac{1}{2}\right) = -c_k\left(\frac{N}{2} + n + \frac{1}{2}\right)$$

Substituting these leads to:

$$r_k(n) =$$
$$w(n)w(N+n)\left[w(n)g_{j-1}(k)c_k\left(\frac{3N}{2} + n + \frac{1}{2}\right)X_{j-1}(k) - w(N+n)g_{j-1}(k)\right.$$
$$c_k\left(\frac{N}{2} + n + \frac{1}{2}\right)X_j(k) - w(n)g_j(k)c_k\left(\frac{3N}{2} + n + \frac{1}{2}\right)X_{j-1}(k) +$$
$$\left. w(N+n)g_j(k)c_k\left(\frac{N}{2} + n + \frac{1}{2}\right)X_j(k)\right]$$

$$r_k(n) = w^2(n)w(N+n)g_{j-1}(k)c_k\left(\frac{3N}{2} + n + \frac{1}{2}\right)X_{j-1}(k) -$$
$$w(n)w^2(N+n)g_{j-1}(k)c_k\left(\frac{N}{2} + n + \frac{1}{2}\right)X_j(k) -$$
$$w^2(n)w(N+n)g_j(k)c_k\left(\frac{3N}{2} + n + \frac{1}{2}\right)X_{j-1}(k) +$$
$$w(n)w^2(N+n)g_j(k)c_k\left(\frac{N}{2} + n + \frac{1}{2}\right)X_j(k)$$

Subtracting $r_k(n)$ from $y_k(n)$ gives the terms building the output of the aliasing reduction:

$$y_k(n) - r_k(n) = (1 - w^2(n)) \left[ w(N+n)g_{j-1}(k)c_k\left(\frac{3N}{2} + n + \frac{1}{2}\right)X_{j-1}(k) + \right.$$
$$w(n)g_{j-1}(k)c_k\left(\frac{N}{2} + n + \frac{1}{2}\right)X_j(k) \right] +$$
$$w^2(n)\left[w(N+n)g_j(k)c_k\left(\frac{3N}{2} + n + \frac{1}{2}\right)X_{j-1}(k) + \right.$$
$$\left. w(n)g_j(k)c_k\left(\frac{N}{2} + n + \frac{1}{2}\right)X_j(k)\right]$$

which correspond to a cross-fade between signals reconstructed with gains $g_{j-1}(k)$ and $g_j(k)$ according to the first aspect illustrated and described with reference to FIGS. 1A, 5A, and 5B.

Subsequently, reference is made to FIGS. 10 and 1D in order to illustrate the relation of time portions and blocks either on the encoder or analysis side or on the decoder or synthesis side.

FIG. 1D illustrates a schematic representation of a 0th time portion to a third time portion and each time portion of these subsequent time portions has a certain overlapping range 170. Based on these time portions, the blocks of the sequence of blocks representing overlapping time portions are generated by the processing discussed in more detail with respect to FIG. 2s showing an analysis side of an aliasing-introducing transform operation.

In particular, the time domain signal illustrated in FIG. 1D, when FIG. 1F applies to the analysis side is windowed by a windower 201 applying an analysis window. Hence, in order to obtain the 0th time portion, for example, the windower applies the analysis window to, for example, 2048 samples, and specifically to sample 1 to sample 2048. Therefore, N is equal to 1024 and a window has a length of 2N samples, which in the example is 2048. Then the windower applies a further analysis operation, but not for the sample 2049 as the first sample of the block, but for the sample 1025 as the first sample in the block in order to obtain the first time portion. Hence, the first overlap range 170, which is 1024 samples long for a 50% overlap, is obtained. This procedure is additionally applied for the second and the third time portions, but with an overlapping in order to obtain a certain overlap range 170.

It is to be emphasized that the overlap does not necessarily have to be a 50% overlap, but the overlap can be higher and lower and there can even be a multi-overlap, i.e., an overlap of more than two windows so that a sample of the time domain audio signal does not contribute to two windows and consequently blocks of spectral values only, but a sample then contributes to even more than two windows/blocks of spectral values. On the other hand, those skilled in the art additionally understand that other window shapes exist which can be applied by the windower 201 of FIG. 2A, which have 0 portions and/or portions having unity values. For such portions having unity values, it appears that such portions typically overlap with 0 portions of preceding or subsequent windows and therefore a certain audio sample located in a constant portion of a window having unity values contributes to a single block of spectral values only.

The windowed time portions as obtained by FIG. 1D then are forwarded to a folder 202 for performing a fold-in operation. This fold-in operation can for example perform a fold-in so that at the output of the folder 202, only blocks of sampling values having N samples per block exist. Then, subsequent to the folding operation performed by the folder 202, a time-frequency converter is applied which is, for example, a DCT-IV converter converting N samples per block at the input into N spectral values at the output of the time-frequency converter 203.

Thus, the sequence of blocks of spectral values obtained at the output of block 203 is illustrated in FIG. 10, specifically showing the first block 191 having associated a first modification value illustrated at 102 in FIGS. 1A and 1B and having a second block 192 having associated the second modification value such as 106 illustrated in FIGS. 1A and 1B. Naturally, the sequence has more blocks 193 or 194, preceding the second block or even leading the first block as illustrated. The first and second blocks 191, 192 are, for example, obtained by transforming the windowed first time portion of FIG. 1D to obtain the first block and the second block is obtained by transforming the windowed second time portion of FIG. 1D by the time-frequency converter 203 of FIG. 2A. Hence, both blocks of spectral values being adjacent in time in the sequence of blocks of spectral values represent an overlapping range covered the first time portion and the second time portion.

Figure 2A:
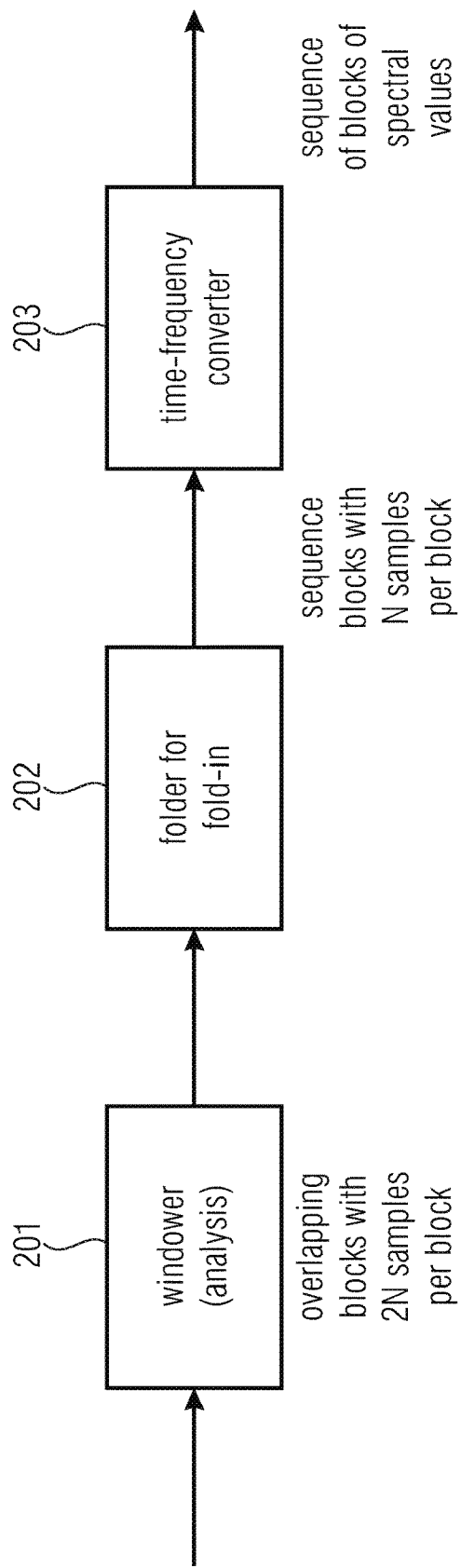
FIG. 2A illustrates an implementation of an aliasing-introducing forward-transform.
Figure 2B:
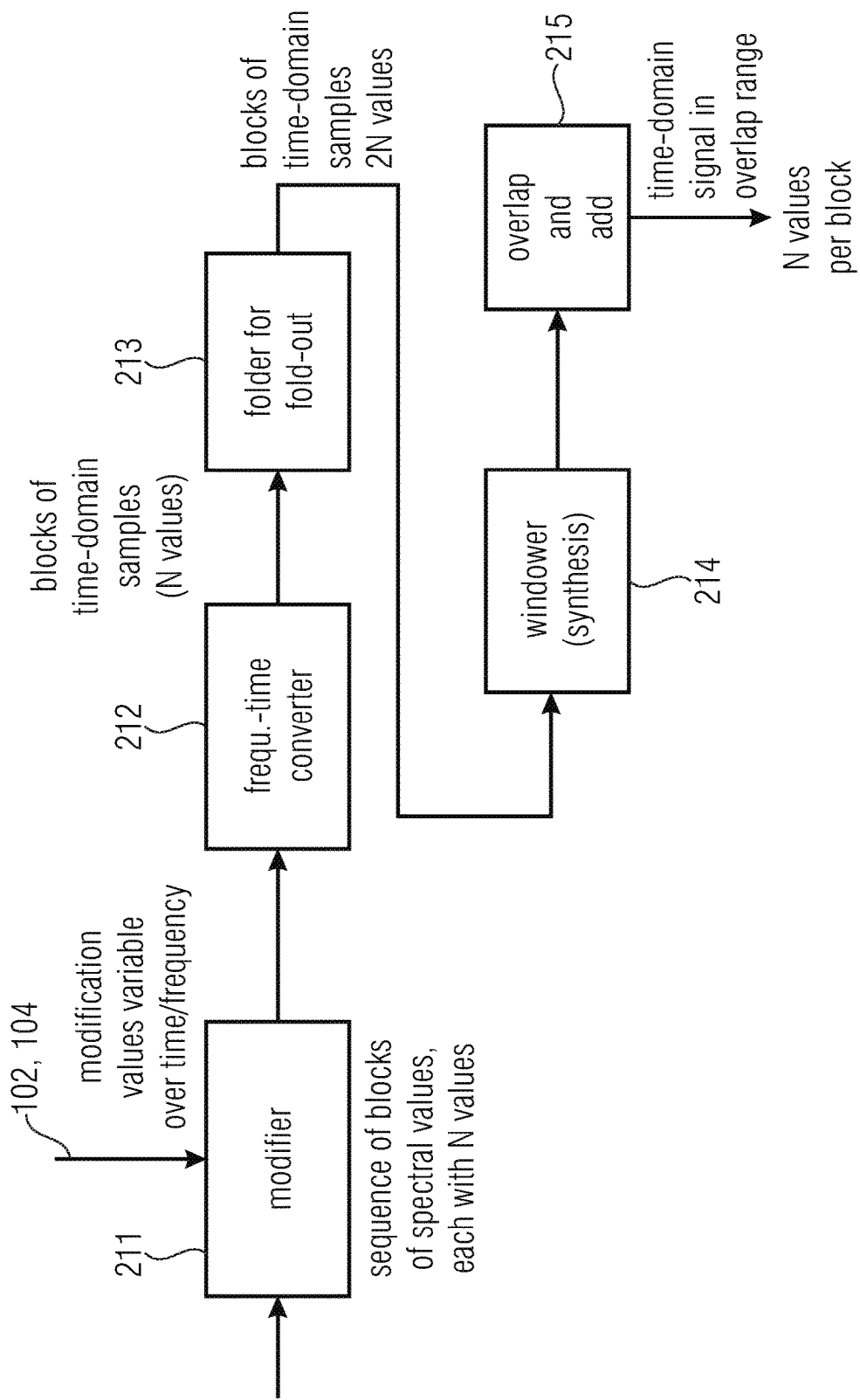
FIG. 2B illustrates an implementation of an aliasing-reducing reverse transform.

Subsequently, FIG. 2B is discussed in order to illustrate a synthesis-side or decoder-side processing of the result of the encoder or analysis-side processing of FIG. 2A. The sequence of blocks of spectral values output by the frequency converter 203 of FIG. 2A is input into a modifier 211. As outlined, each block of spectral values has N spectral values for the example illustrated in FIGS. 10 to 2B. Each block has associated its modification values such as 102, 104 illustrated in FIGS. 1A and 1B. Then, in a typical IMDCT operation or a typical redundancy-reducing synthesis transform, operations illustrated by a frequency-time converter 212, a folder 213 for folding out, a windower 214 for applying a synthesis window and an overlap/adder operation illustrated by block 215 are performed in order to obtain the time domain signal in the overlap range. The same has, in the example, 2N values per block, so that after each overlap and add operation, N new aliasing-free time domain samples are obtained provided that the modification values 102, 104 are not variable over time or frequency. However, if those values are variable over time and frequency, then the output signal of block 215 is not aliasing-free, but this problem is addressed by the first and the second aspect of the present invention as discussed in the context of FIGS. 1B and 1A and as discussed in the context of the other figures in the specification.

Subsequently, a further illustration of the procedures performed by the blocks in FIGS. 2A and 2B is given.

The illustration is exemplified by reference to the MDCT, but other aliasing-introducing transforms can be processed in a similar and analogous manner. As a lapped transform, the MDCT is a bit unusual compared to other Fourier-related transforms in that it has half as many outputs as inputs (instead of the same number). In particular, it is a linear function F: $R^{2N} \to R^N$ (where R denotes the set of real numbers). The 2N real numbers x0, ..., x2N−1 are transformed into the N real numbers X0, ..., XN−1 according to the formula:

$$X_k = \sum_{n=0}^{2N-1} x_n \cos\left[\frac{\pi}{N}\left(n + \frac{1}{2} + \frac{N}{2}\right)\left(k + \frac{1}{2}\right)\right]$$

(The normalization coefficient in front of this transform, here unity, is an arbitrary convention and differs between treatments. Only the product of the normalizations of the MDCT and the IMDCT, below, is constrained.)

The inverse MDCT is known as the IMDCT. Because there are different numbers of inputs and outputs, at first glance it might seem that the MDCT should not be invertible. However, perfect invertibility is achieved by adding the overlapped IMDCTs of time-adjacent overlapping blocks, causing the errors to cancel and the original data to be retrieved; this technique is known as time-domain aliasing cancellation (TDAC).

The IMDCT transforms N real numbers X0, . . . , XN−1 into 2N real numbers y0, . . . , y2N−1 according to the formula:

$$y_n = \frac{1}{N} \sum_{k=0}^{N-1} X_k \cos\left[\frac{\pi}{N}\left(n + \frac{1}{2} + \frac{N}{2}\right)\left(k + \frac{1}{2}\right)\right]$$

(Like for the DCT-IV, an orthogonal transform, the inverse has the same form as the forward transform.)

In the case of a windowed MDCT with the usual window normalization (see below), the normalization coefficient in front of the IMDCT should be multiplied by 2 (i.e., becoming 2/N).

In typical signal-compression applications, the transform properties are further improved by using a window function wn (n=0, . . . , 2N−1) that is multiplied with xn and yn in the MDCT and IMDCT formulas, above, in order to avoid discontinuities at the n=0 and 2N boundaries by making the function go smoothly to zero at those points. (That is, one windows the data before the MDCT and after the IMDCT.) In principle, x and y could have different window functions, and the window function could also change from one block to the next (especially for the case where data blocks of different sizes are combined), but for simplicity one considers the common case of identical window functions for equal-sized blocks.

The transform remains invertible (that is, TDAC works), for a symmetric window wn=w2N−1−n, as long as w satisfies the Princen-Bradley condition:

$$w_n^2 + w_{n+N}^2 = 1$$

various window functions are used. A window that produces a form known as a modulated lapped transform is given by:

$$w_n = \sin\left[\frac{\pi}{2N}\left(n + \frac{1}{2}\right)\right]$$

and is used for MP3 and MPEG-2 AAC, and $$w_n = \sin\left(\frac{\pi}{2}\sin^2\left[\frac{\pi}{2N}\left(n + \frac{1}{2}\right)\right]\right)$$

for Vorbis. AC-3 uses a Kaiser-Bessel derived (KBD) window, and MPEG-4 AAC can also use a KBD window.

Note that windows applied to the MDCT are different from windows used for some other types of signal analysis, since they have to fulfill the Princen-Bradley condition. One of the reasons for this difference is that MDCT windows are applied twice, for both the MDCT (analysis) and the IMDCT (synthesis).

As can be seen by inspection of the definitions, for even N the MDCT is essentially equivalent to a DCT-IV, where the input is shifted by N/2 and two N-blocks of data are transformed at once. By examining this equivalence more carefully, important properties like TDAC can be easily derived.

In order to define the precise relationship to the DCT-IV, one has to realize that the DCT-IV corresponds to alternating even/odd boundary conditions: even at its left boundary (around n=−½), odd at its right boundary (around n=N−½), and so on (instead of periodic boundaries as for a DFT). This follows from the identities; thus, if its inputs:

$$\cos\left[\frac{\pi}{N}\left(-n - 1 + \frac{1}{2}\right)\left(k + \frac{1}{2}\right)\right] = \cos\left[\frac{\pi}{N}\left(n + \frac{1}{2}\right)\left(k + \frac{1}{2}\right)\right] \text{ and}$$

$$\cos\left[\frac{\pi}{N}\left(2N - n - 1 + \frac{1}{2}\right)\left(k + \frac{1}{2}\right)\right] = -\cos\left[\frac{\pi}{N}\left(n + \frac{1}{2}\right)\left(k + \frac{1}{2}\right)\right].$$

Thus, if its inputs are an array x of length N, one can imagine extending this array to (x, −xR, −x, xR, . . . ) and so on, where xR denotes x in reverse order.

Consider an MDCT with 2N inputs and N outputs, where one divides the inputs into four blocks (a, b, c, d) each of size N/2. If one shifts these to the right by N/2 (from the +N/2 term in the MDCT definition), then (b, c, d) extend past the end of the N DCT-IV inputs, so one has to "fold" them back according to the boundary conditions described above.

Thus, the MDCT of 2N inputs (a, b, c, d) is exactly equivalent to a DCT-IV of the N inputs: (−cR−d, a−bR), where R denotes reversal as above.

This is exemplified for window function 202 in FIG. 2A. "a" is the portion 204b, "b" is the portion 205a, "c" is the portion 205b, and "d" is the portion 206a.

(In this way, any algorithm to compute the DCT-IV can be trivially applied to the MDCT.)

Similarly, the IMDCT formula above is precisely ½ of the DCT-IV (which is its own inverse), where the output is extended (via the boundary conditions) to a length 2N and shifted back to the left by N/2. The inverse DCT-IV would simply give back the inputs (−cR−d, a−bR) from above. When this is extended via the boundary conditions and shifted, one obtains:

IMDCT(MDCT(a,b,c,d))=(a−bR,b−aR,c+dR,d+cR)/2.

Half of the IMDCT outputs are thus redundant, as b−aR=−(a−bR)R, and likewise for the last two terms. If one groups the input into bigger blocks A,B of size N, where A=(a, b) and B=(c, d), one can write this result in a simpler way:

IMDCT(MDCT(A,B))=(A−AR,B+BR)/2

One can now understand how TDAC works. Suppose that one computes the MDCT of the time-adjacent, 50% overlapped, 2N block (B, C). The IMDCT will then yield, analogous to the above: (B−BR, C+CR)/2. When this is added with the previous IMDCT result in the overlapping half, the reversed terms cancel and one obtains simply B, recovering the original data.

The origin of the term "time-domain aliasing cancellation" is now clear. The use of input data that extend beyond the boundaries of the logical DCT-IV causes the data to be aliased in the same way that frequencies beyond the http:// en.wikipedia.org/wiki/Nyquist_frequency Nyquist frequency are aliased to lower frequencies, except that this aliasing occurs in the time domain instead of the frequency domain: one cannot distinguish the contributions of a and of bR to the MDCT of (a, b, c, d), or equivalently, to the result of IMDCT(MDCT(a, b, c, d))=(a−bR, b−aR, c+dR, d+cR)/2. The combinations c−dR and so on, have precisely the right signs for the combinations to cancel when they are added.

For odd N (which are rarely used in practice), N/2 is not an integer so the MDCT is not simply a shift permutation of a DCT-IV. In this case, the additional shift by half a sample means that the MDCT/IMDCT becomes equivalent to the DCT-III/II, and the analysis is analogous to the above.

We have seen above that the MDCT of 2N inputs (a, b, c, d) is equivalent to a DCT-IV of the N inputs (−cR−d, a−bR). The DCT-IV is designed for the case where the function at the right boundary is odd, and therefore the values near the right boundary are close to 0. If the input signal is smooth, this is the case: the rightmost components of a and bR are consecutive in the input sequence (a, b, c, d), and therefore their difference is small. Let us look at the middle of the interval: if one rewrites the above expression as (−cR−d, a−bR)=(−d, a)−(b,c)R, the second term, (b,c)R, gives a smooth transition in the middle. However, in the first term, (−d, a), there is a potential discontinuity where the right end of −d meets the left end of a. This is the reason for using a window function that reduces the components near the boundaries of the input sequence (a, b, c, d) towards 0.

Above, the TDAC property was proved for the ordinary MDCT, showing that adding IMDCTs of time-adjacent blocks in their overlapping half recovers the original data. The derivation of this inverse property for the windowed MDCT is only slightly more complicated.

Consider to overlapping consecutive sets of 2N inputs (A,B) and (B,C), for blocks A,B,C of size N. Recall from above that when (A, B) and (B, C) are input into an MDCT, an IMDCT, and added in their overlapping half, one obtains $(B+B_R)/2+(B-B_R)/2=B$, the original data.

Now one supposes that one multiplies both the MDCT inputs and the IMDCT outputs by a window function of length 2N. As above, one assumes a symmetric window function, which is therefore of the form $(W, W_R)$ where W is a length-N vector and R denotes reversal as before. Then the Princen-Bradley condition can be written as $W^2+W_R^2=(1, 1 \ldots)$, with the squares and additions performed elementwise.

Therefore, instead of performing an MDCT (A,B), one now MDCTs (WA,WRB) with all multiplications performed elementwise. When this is input into an IMDCT and multiplied again (elementwise) by the window function, the last-N half becomes:

$$W_R(W_RB+(W_RB)_R)=W_R(W_RB+WB_R)=W_R^2B+WW_RB_R$$

(Note that one no longer has the multiplication by ½, because the IMDCT normalization differs by a factor of 2 in the windowed case.)

Similarly, the windowed MDCT and IMDCT of (B,C) yields, in its first-N half:

$$W \cdot (WB-W_RB_R)=W^2B-WW_RB_R$$

When one adds these two halves together, one recovers the original data. The reconstruction is also possible in the context of window switching, when the two overlapping window halves fulfill the Princen-Bradley condition. Aliasing reduction could in this case done exactly the same way as described above. For transforms with multiple overlap, more than two branches would be necessitated using all involved gain values.

Subsequently, the first aspect is discussed in more detail by referring to FIGS. 5A and 5B. Specifically, the processor 100 illustrated in FIG. 1A may include all or just a part of the elements 501 to 506 illustrated in FIG. 5A in the box defined by reference number 100. Advantageously, the processor 100 comprises a modifier for modifying the first block of the sequence illustrated as $X_{j-1}$ using the at least one first modification value 102 to obtain a first modified block 551. This modification is performed by a gain multiplier 510, which can be implemented digitally or analogous or in any other suitable way. Furthermore, the modifier is configured to modify the second block indicated as $X_j(k)$ using the at least one second modification value 106 to obtain a second modified block 552. This modification is again performed by a multiplier 509 which can be implemented in the same way as the multiplier 510 or in a different manner. Furthermore, the modifier is configured for modifying the second block $X_j(k)$ using the at least one first modification value 102 to obtain a third modified block 553, where this modification again can be performed by a multiplier 508 which can be implemented in the same or in a different way with respect to multipliers 510 or 509.

Furthermore, the modifier is configured to modify the first block $x_{j-1}$ using the at least one second modification value 106, i.e. $X_j(k)$ to obtain a fourth modified block 554. Advantageously, the fourth modified block 554 is again generated by a multiplier 507 which can be implemented in the same or in a different way with respect to multipliers 510, 509, 508.

Furthermore, the processor 100 comprises a spectrum-time converter for converting the first to fourth modified blocks 551 to 554 into corresponding time representations 561, 562, 563, 564. In particular, the spectrum-time converter is implemented as comprising the IMDCT blocks 501, 502, 503, 504 generating corresponding first to fourth modified blocks 561 to 564. The spectrum-time converter can be implemented as an IMDCT algorithm comprising actual elements 212 (frequency-time converter), 213 (folder for a fold-out) and 214 (a synthesis windower) of FIG. 2B. However, the spectrum-time converter can be implemented as any other aliasing-reducing transformer which results, at an output, in a block of time domain sampling values having a higher number of samples compared to the number of samples at an input thereof.

Alternatively, for a computationally efficient implementation, not the full IMDCT or the entire aliasing-reducing inverse transform might be calculated, but only the temporal section containing the aliasing reduced or aliasing cancelling signal. Along this lines, e.g., in case of IMDCT one fold-out operation and half of the synthesis windowing operation might be omitted. Hence, the processor may be configured for performing lapped transforms having an overlapping range, and wherein the processor is configured for only performing operations influencing values in the overlapping range and for not performing operations not influencing values in the overlapping range. Regarding FIG. 2B, the operations not influencing the overlapping range are the fold-out operations of block 213 influencing the first half of the preceding block and the second half of the current block. Furthermore, corresponding windowing operations for the first half of the preceding block and the second half of the current block are also not necessitated for this efficient implementation. This is due to the fact that only the second half of the preceding block and the first half of the current block for the overlapping range.

In the embodiment in FIG. 5A, the number of samples input into the IMDCT block is equal to N and the number of samples output by the IMDCT block is 2N. However, other number ratios corresponding to other overlap factors can be implemented as long as the number of samples output by the spectrum-time converter is greater than the number of spectral domain samples input into the corresponding spectrum-time converter.

Furthermore, the spectrum-time converter can be implemented as containing individual spectrum time converters for each individual signal to be converted or may comprise a single spectrum time converter such as only block 501 of FIG. 5A and a corresponding sequence controller in order to sequentially transform one modified block after the other.

Furthermore, the processor 100 comprises an overlap-adder for overlap-adding representations of the first 561 and the third 563 modified blocks to obtain the first result signal 104 which is aliasing-free or at least aliasing-reduced.

Furthermore, the overlap-adder is configured for overlap-adding time representations of the second 562 and the fourth 564 modified blocks to obtain the second result signal 108 which is also aliasing-free or at least aliasing-reduced. This overlap-add operation for the first and the third time representations is performed by overlap-add block 505 and the other overlap-add operation for the time representations of the second and fourth modified blocks, i.e., for the signal on line 562 and 564 is performed by a further overlap-add block 506. Again, the overlap-adder can have separate such blocks or a single block and a corresponding sequence control or can be implemented in any other imaginable way in order to obtain the defined result. Advantageously, each of the blocks 505, 506 is implemented in the corresponding block 215 described in the context of FIG. 2B.

Advantageously, the combiner 110 in FIG. 5A is configured to combine the first result signal 104 and the second result signal 108 by fading out the first result signal and by fading in the second result signal. To this end, a fade-out block 520 for the first result signal 104 and the fade-in block 521 for the second result signal are provided. The actual combination may be performed by an adder 522 illustrated in FIG. 5A as a separate element. However, it is to be emphasized that the actual operation of the combiner 510 is a weighted linear combination where, for each sample, the fade-out function 520 provides a certain weighting factor and then the corresponding sample weighted by this weighting factor is added to a corresponding sample from the other result signal being weighted with a weighting factor provided by the fade-in function 521 for the corresponding sample.

As outlined, the processor 100 is configured to perform an IMDCT operation in performing a spectrum-time conversion and this IMDCT operation may comprise the functionalities of blocks 212, 213, 214, but the IMDCT operation can be implemented in any other way, and a number efficient IMDCT algorithms obtaining basically the same result as discussed in the context of FIGS. 2A and 2B are well-known.

Furthermore, the processor 100 is configured to perform an overlap-add processing operation 505, 506 in calculating the first and second result signals in an overlap range illustrated at 170 in FIG. 1D. Furthermore, the combiner 110 is configured to combine the first and second result signals in a combining range, i.e., for example in an overlap-add range where this combining range is equal to the overlap range.

Hence, it is to be emphasized that FIG. 1D can also be considered to represent the overlap-add operation performed by block 215 on the synthesis side. Then, each "time portion" in FIG. 1D represents a block output by the synthesis windower 214 of FIG. 2B, and samples in the overlap range of the one windowed block are added to samples in the overlap range of the next windowed block. Furthermore, the corresponding samples are weighted with weighting factors provided by a fade-out function such as 520 and a fade-in function 522 as necessitated. For example, when the first time portion corresponds to a windowed block, then, in the overlap range 170 in FIG. 1D, the first time portion would be faded out during the overlap range and at the same time, the second time portion would be faded in within the overlap range. Hence, a fade-out function would provide fade-out factors decreasing from 1 to 0 in a linear way and equally distributed over the number of samples from 1 to N. Thus, when the length of a windowed block is 2N, then the interval between 1 and 0 would be separated into N equal intervals and for each interval, the fade-out factor would be determined as the center of each interval, for example. Similarly, a fade-in function would be a function providing linearly increasing fading-in factors from 0 to 1 again with N equal intervals.

However, other functions apart from linear functions can be applied, and it is advantageous that, for each sample, the sum of the fade in factor for the sample and the fade-out factor for the sample is equal to 1 so that the fade-in/fade-out or, generally, the cross-fade does not result in an amplitude or loudness variation of the audio signal. Therefore, a sum of a fade-out part and the fade-in part for each sample in a cross-fade range is constant and equal to 1.

Advantageously, the present invention is applied in the context of a bandwidth filling functionalities in the context of FIG. 5B. Bandwidth extension means that the bandwidth of the input signal is extended so that typically the output signal generated by the bandwidth extension technology has a higher bandwidth than the input signal. On the other hand, however, bandwidth filling technologies also exist, which do not necessarily increase the bandwidth, but which fill in spectral holes within the input signal. When the upper frequency band is considered to be a "spectral hole", then a bandwidth filling functionality is similar to a bandwidth extension technology. However, if a spectral hole of the input signal which is located, with respect to frequency, below a range for which spectral values exist, then the bandwidth filling functionality does not extend the bandwidth, but the result of the technology has the same bandwidth as the input. In this context, SBR, for example, is an example of a bandwidth extension technology and intelligent gap filling (IGF) is an example for a general bandwidth filling functionality without necessarily increasing the bandwidth of the input signal.

Figure 3C:
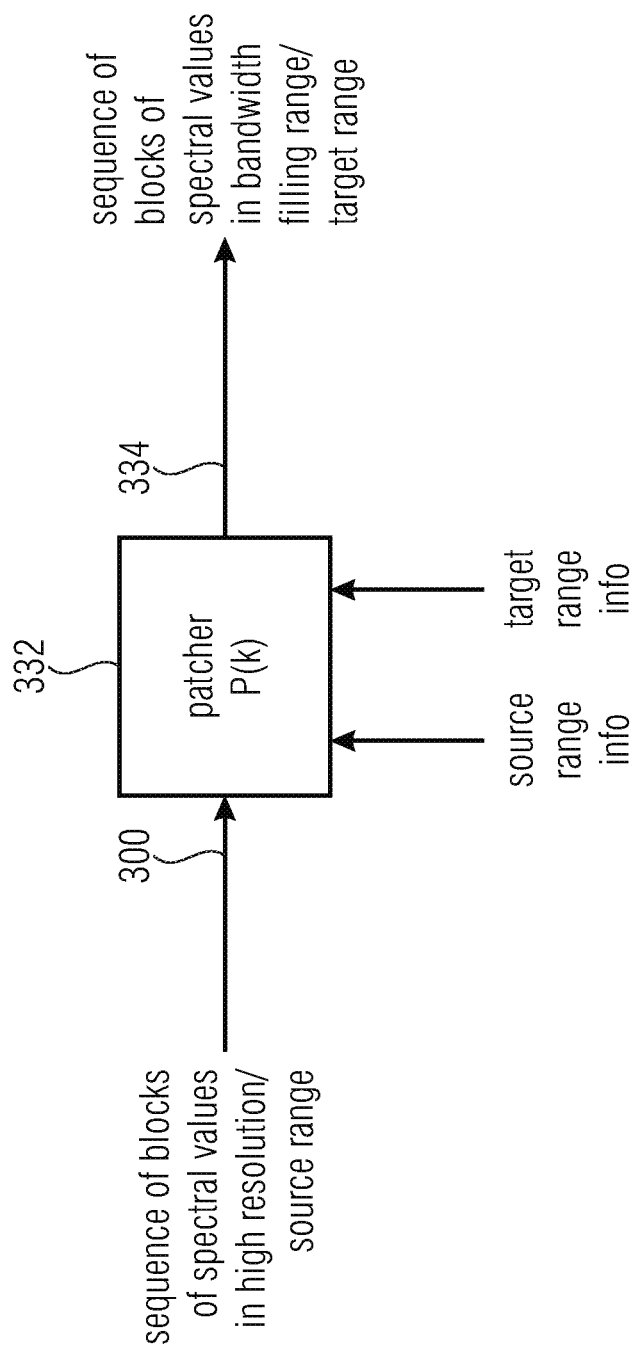
FIG. 3C illustrates a schematic diagram of a bandwidth extension application for the first and second aspects.

Advantageously, the processor 100 is configured to apply a bandwidth filling functionality having a patching function to patch spectral values form a source range 300 to a target range 334, and the processor is configured to apply the patching function in calculating the first and the second result signals. Exemplarily, FIG. 3C illustrates a patcher for generating, from a sequence of blocks of spectral values which have a high resolution or which represent a source range, a sequence 334 of blocks of spectral values in a bandwidth filling range or target range. The patcher is indicated at 332 in FIG. 3C and may be implemented to apply a patching function P(k) as illustrated. Optionally, as illustrated in FIG. 3C and in case of a bandwidth filling functionality applied, the construction of the processor 100 and the combiner 110 is the same as if no bandwidth filling is applied apart from the fact that the sequence of blocks of spectral values indicated at 334 in FIG. 5B is an output of the patcher in FIG. 3C and the gain factors 102, 106 or, generally, the modification factors for each block, are as defined by the certain bandwidth filling functionality such as spectral band replication, intelligent gap filling or any other bandwidth filling functionality. Thus, the patcher 332 can be part of the processor or can be implemented as a pre-processing stage applied at the input into the processor.

Hence, the apparatus for processing an audio signal comprises a patcher, either as part of the processor 100 or as a block applied in the signal processing direction, before the processor 100 of FIG. 1A, where this patcher is configured for generating the first block in a bandwidth filling range using spectral values from a different frequency range, i.e., from a source range in accordance with a patching function for the first block and the patcher is additionally configured for generating the second block of spectral values in a bandwidth filling range or target range using spectral range from a different frequency region or source region in accordance with a patching function for the second block, which can be the same patching function or a different patching function.

Furthermore, as already discussed in the context of FIG. 5A or 5B, the processor is configured to perform a multiplication-like functionality 510, 509, 508, 507 for modifying the first and second blocks using gain functions or gain values as modifications values.

Further embodiments of the second aspect of the present invention are discussed in the context of FIGS. 3A and 3B.

FIGS. 3A and 3B all show an apparatus for processing an audio signal comprising a sequence of blocks of the spectral values 114. Each implementation comprises a processor 150 for calculating an aliasing-affected signal 154 using at least one first modification values 102 for a first block of the sequence of blocks 114 and at least one different second modification value for a second block of the sequence of blocks. Advantageously, the functionality of the processor for calculating an aliasing-affected signal comprises a gain modifier for modifying the first block using at least one first modification value to obtain a first modified block 351. This modification is performed by a multiplier 310 but can be implemented as discussed in the context of the corresponding multiplier 510 of FIG. 5. Furthermore, the gain modifier is configured for modifying the second block $X_j(k)$ using the at least one second modification value 106 to obtain a second modified block 352. This modification once again can be performed by a multiplier 309, which again can be implemented as discussed in the context of multiplier 510. To generate the aliasing-affected signal, the processor 150 comprises a spectrum-time converter for converting the first and second modified blocks into time domain representations 361, 362, and additionally an overlap-adder is configured for overlap adding the time domain representations of the first and second blocks, i.e., 361 and 362, to obtain the aliasing-affected signal 154.

Furthermore, the processor is also configured for estimating the aliasing-error signal. To this end, the processor 150 comprises a further functionality of the gain modifier illustrated by a multiplier 308 and 307 in order to modify the first block and the second block using the at least one first modification value 102 or the at least one second modification value 106 to obtain a third modified block 353 and a fourth modified block 354.

Furthermore, a spectrum-time converter is illustrated at 303 and 304 to convert the third modified block 353 and the fourth modified block 354 into a time domain representation 363 and 364, respectively, and these third and fourth modified blocks are then processed by an overlap-adder for overlap-adding the time domain representations of the third and fourth modified blocks in order to obtain the aliasing-error signal 158.

In order to manipulate the aliasing-error signal 158 for obtaining a good combination with the aliasing-affected signal 158, the combiner comprises a windower 330 for applying a window function, and a time-reversal block 340 for time-reversing a signal.

The difference between the gain modification values is applied in the frequency domain, i.e., in the processor before performing the spectral-time conversion in blocks 303 and 304. To this end, reference is made to FIG. 3A. In particular, in this embodiment, the processor comprises the gain modifier, which is configured for modifying the first block $x_{j-1}$ via the multiplier 307 using a difference between the at least one first modification value and the at least one second modification value, where this difference is calculated per frequency value or spectral value as indicated by the index k in FIG. 3A. Furthermore, the gain modifier is configured for modifying the second block using the difference 125 within a multiplier 308 in order to obtain the third modified block 353 and the fourth modified block 354. In this embodiment, which is illustrated in FIG. 3A, the combiner comprises the window 330 and the time-reversal 340.

Although the sequence of processing operations within the combiner is indicated so that the windower 330 is operated in signal flow direction before the time reversal 340, it becomes clear that the order of operations of these elements can also be reversed.

Therefore, the processor 150 in FIG. 3A is so that the gain modifier modifies the first block and the second block using the at least one first or the at least one second modification values. The modification in FIG. 3A incurs both modification values due to the fact that the difference between both modification values is actually used for modification which is performed, for example, by the multipliers 308, 307, where the gain difference is indicated at 125 at FIG. 3A.

Furthermore, as outlined, the windowing operation 330 and the time reversal operation 340 are applied. However, for other implementations, for example when the spectral-time transform is implemented in a different way, it might not be necessitated to apply a time reversal 340 at all. Furthermore, when no analysis or synthesis windows are applied, but when only, for example, "rectangular windows" are applied, then the windowing 330 can also be dispensed with.

In an embodiment, however, the windower and the time reverser operator are illustrated and are positioned in the illustrated order.

Subsequently, FIG. 3B is discussed in more detail. FIG. 3B is analogous to FIG. 3A in that the application of the gain "difference" is applied in the frequency domain. However, due to the fact that a patching operation is applied, the gain difference cannot be applied explicitly, but the different patching operations are accounted for.

Therefore, in order to obtain the aliasing-error signal, in the patching operation in the context of a bandwidth filling functionality as discussed in the context of FIG. 3C, the following procedures are applied. First of all, the block of spectral values 306a is calculated, which is the first block, but the first block is patched via the patching operation for the second block and this first block 306a is then multiplied by the gain factor 106 for the second block.

Furthermore, as illustrated, the first block of spectral values 306b is generated, which is the same as the first block 304b, i.e., the first block, to which the patching operation associated with the first block is applied, and the signal is then multiplied by the first modification factor 102. Then the signals generated by the multipliers are combined such as subtracted or added together in 329 which can be implemented as a subtractor or an adder with a negated input etc. Then the third modified block is obtained which basically corresponds to block 353. In a similar manner, block 354 is obtained, i.e., by patching the second block $X_j$ with the patching operation for the second block, i.e., by using block 304b and multiplying this block with the second modification factor 106. However, the second block also is subjected to a patching algorithm associated with the first block as indicated at item 306d and the result is then multiplied by the first multiplication factor via multiplier 307b. The output signals of the multipliers 307a and 307b then are added together in adder 328 in order to finally obtain the fourth modified block 354. Then the third and fourth modified blocks 353 and 354 are subjected to a spectral-time transform as discussed in the context of FIG. 3A and then are overlap-added using block 306 as illustrated in FIG. 3B. Then the same operations in the combiner, such as windowing 330, time-reversal 340, and finally combining 152 are performed in order to finally obtain the aliasing-free signal 112.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the Internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is, therefore, intended that the following appended claims be interpreted as including all such alterations, permutations, and equivalents as fall within the true spirit and scope of the present invention.

The invention claimed is:

1. An apparatus for processing an audio signal, the audio signal comprising a sequence of blocks of spectral values, the apparatus comprising;
   a processor for processing the sequence of blocks of spectral values of the audio signal using at least one modification value for a first block to acquire aliasing-reduced or aliasing-free first result signal in an overlap range and using at least one second different modification value for a second block of the sequence of blocks to acquire an aliasing-reduced or aliasing-free second result signal in the overlap range; and
   a combiner for combining the first result signal and the second result signal in the overlap range to acquire a processed audio signal for the overlap range, wherein the processor comprises:
a modifier for modifying the first block of the sequence using the at least one first modification value to acquire a first modified block, for modifying the second block of the sequence using the at least one second modification value to acquire a second modified block, for modifying the second block using the at least one first modification value to acquire a third modified block and for modifying the first block using the at least one second modification value to acquire a fourth modified block;
a spectrum-time converter for converting the first to fourth modified blocks into a corresponding time representation; and
an overlap-adder for overlap-adding time representations of the first and third modified blocks to acquire the first result signal and for overlap-adding time representations of the second and fourth modified blocks to acquire the second result signal, wherein the combiner is configured to combine the first result signal and the second result signal by fading out the first result signal and by fading in the second result signal and adding both signals,
wherein at least one of the processor, the combiner, the modifier, the spectrum time converter, and the overlap-adder comprises a hardware implementation.

2. The apparatus of claim 1, wherein the processor is configured to perform an inverse modified discrete cosine transform operation in performing a spectrum-time conversion.

3. The apparatus of claim 1,
wherein the processor is configured to perform an overlap-add processing operation in calculating the first and second result signals in the overlap range, and
wherein the combiner is configured to combine the first and second result signals in a combining range, wherein the combining range is identical to the overlap range.

4. The apparatus of claim 1,
wherein the combiner is configured to perform a cross-fade function,
wherein the cross-fade function comprises a fade-out part and a fade-in part, and
wherein a sum of a weighting coefficient of the fade-out part and of a weighting coefficient of the fade-in part for a sample in a cross-fade range is constant.

5. The apparatus of claim 1,
wherein the combiner is configured to perform a cross fade operation, and
wherein the cross-fade operation comprises a monotonically decreasing fade-out part and a monotonically increasing fade-in part.

6. The apparatus of claim 1,
wherein the processor is configured for applying a bandwidth filling operation comprising a patching function to patch spectral values from a source range to a target range, and
wherein the processor is configured for applying the patching function in calculating the first and second result signals.

7. The apparatus of claim 1, further comprising:
a patcher for generating the first block in a bandwidth filling range using spectral values from a different frequency range in accordance with a patching function for the first block, and for generating the second block in a bandwidth filling range comprising spectral values for a different frequency region in accordance with a patching function associated with the second block.

8. The apparatus of claim 1, wherein the processor is configured to perform a multiplication operation to the first and second blocks using the gain functions as modification values.

9. The apparatus of claim 1,
wherein the processor is configured to process the sequence of blocks,
wherein the first block is adjacent in time with the second block, and
wherein the first and second blocks being adjacent in time comprising an overlap equaling 55% to 45% of a time portion.

10. The apparatus of claim 1, wherein the processor is configured to apply a spectral-time conversion operation comprising a spectrum-time transform part and a synthesis window part applied to an output of the spectrum-time transform part.

11. The apparatus of claim 1, wherein the processor is configured to operate using modification values varying over time and frequency.

12. The apparatus of claim 1, wherein the processor is configured for performing lapped transforms comprising an overlapping range, and wherein the processor is configured for only performing operations influencing values in the overlapping range and for not performing operations not influencing values in the overlapping range.

13. A method for processing an audio signal, the audio signal comprising a sequence of blocks of spectral values, the method comprising;
processing, by a processor, the sequence of blocks of spectral values of the audio signal using at least one modification value for a first block to acquire aliasing-reduced or aliasing-free first result signal in an overlap range and using at least one second different modification value for a second block of the sequence of blocks to acquire an aliasing-reduced or aliasing-free second result signal in the overlap range; and
combining, by a combiner, the first result signal and the second result signal in the overlap range to acquire a processed audio signal for the overlap range,
wherein the processing comprises:
modifying the first block of the sequence using the at east one first modification value to acquire a first modified block,
modifying the second block of the sequence using the at least one second modification value to acquire a second modified block,
modifying the second block using the at least one first modification value to acquire a third modified block,
modifying the first block using the at least one second modification value to acquire a fourth modified block,
converting, by a spectrum-time converter, the first to fourth modified blocks into a corresponding time representation;
overlap-adding, by one of a first and a second overlap-adder, time representations of the first and third modified blocks to acquire the first result signal and
overlap-adding, by one of the first and the second overlap-adder, time representations of the second and fourth modified blocks to acquire the second result signal,
wherein the combiner is configured to combine the first result signal and the second result signal by fading out the first result signal and by fading in the second result signal and adding both signals.

14. A non-transitory digital storage medium comprising computer-readable code stored thereon to perform, when said storage medium is run by a computer or a processor, a method for processing an audio signal, the audio signal comprising a sequence of blocks of spectral values, the method comprising:
  processing the sequence of blocks of spectral values of the audio signal using at least one modification value for a first block to acquire aliasing-reduced or aliasing-free first result signal in an overlap range and using at least one second different modification value for a second block of the sequence of blocks to acquire an aliasing-reduced or aliasing-free second result signal in the overlap range;
  combining, by a combiner, the first result signal and the second result signal in the overlap range to acquire a processed audio signal for the overlap range;
  wherein the processing comprises:
    modifying the first block of the sequence using the at east one first modification value to acquire a first modified block;
    modifying the second block of the sequence using the at least one second modification value to acquire a second modified block;
    modifying the second block using the at least one first modification value to acquire a third modified block;
    modifying the first block using the at least one second modification value to acquire a fourth modified block;
    converting the first to fourth modified blocks into a corresponding time representation;
    overlap-adding time representations of the first and third modified blocks to acquire the first result signal; and
  overlap-adding time representations of the second and fourth modified blocks to acquire the second result signal; and
  wherein the combiner is configured to combine the first result signal and the second result signal by fading out the first result signal and by fading in the second result signal and adding both signals.

* * * * *

UNITED STATES PATENT AND TRADEMARK OFFICE
CERTIFICATE OF CORRECTION

| | | |
|---|---|---|
| PATENT NO. | : 10,157,624 B2 | Page 1 of 1 |
| APPLICATION NO. | : 15/047322 | |
| DATED | : December 18, 2018 | |
| INVENTOR(S) | : Sascha Disch et al. | |

It is certified that error appears in the above-identified patent and that said Letters Patent is hereby corrected as shown below:

In the Claims

In Column 24, Claim 13, Lines 45-46:
....using the at east one first modification value....
Should read:
....using the at least one first modification value....

In Column 25, Claim 14, Lines 21-22:
....using the at east one first modification value....
Should read:
....using the at least one first modification value....

Signed and Sealed this
Thirteenth Day of August, 2019

Andrei Iancu
*Director of the United States Patent and Trademark Office*